(12) United States Patent
Miura et al.

(10) Patent No.: US 12,412,944 B2
(45) Date of Patent: Sep. 9, 2025

(54) BATTERY TEMPERATURE CONTROL DEVICE

(71) Applicant: DENSO CORPORATION, Kariya (JP)

(72) Inventors: Kouji Miura, Kariya (JP); Yoshiki Katoh, Kariya (JP); Masamichi Makihara, Kariya (JP); Atsushi Yamada, Kariya (JP); Kenta Kayano, Kariya (JP); Hiroaki Kawano, Kariya (JP); Tooru Okamura, Kariya (JP); Naoya Makimoto, Kariya (JP); Takahiro Maeda, Kariya (JP)

(73) Assignee: DENSO CORPORATION, Kariya (JP)

( * ) Notice: Subject to any disclaimer, the term of this patent is extended or adjusted under 35 U.S.C. 154(b) by 548 days.

(21) Appl. No.: 17/953,415

(22) Filed: Sep. 27, 2022

(65) Prior Publication Data
US 2023/0016470 A1    Jan. 19, 2023

Related U.S. Application Data

(63) Continuation of application No. PCT/JP2021/013625, filed on Mar. 30, 2021.

(30) Foreign Application Priority Data

Apr. 1, 2020  (JP) .................................. 2020-065853

(51) Int. Cl.
*H01M 10/63* (2014.01)
*H01M 10/0525* (2010.01)
(Continued)

(52) U.S. Cl.
CPC ....... *H01M 10/63* (2015.04); *H01M 10/0525* (2013.01); *H01M 10/486* (2013.01);
(Continued)

(58) Field of Classification Search
CPC .. B60H 1/22; H01M 10/0525; H01M 10/486; H01M 10/613; H01M 10/615;
(Continued)

(56) References Cited

U.S. PATENT DOCUMENTS

| 2017/0021698 A1 | 1/2017 | Hatakeyama et al. |
| 2020/0198443 A1 | 6/2020 | Kato et al. |

FOREIGN PATENT DOCUMENTS

| JP | 2014229480 A | * 12/2014 |
| JP | 2015186989 A | 10/2015 |

(Continued)

OTHER PUBLICATIONS

Machine translation jP2014229480A (Year: 2014).*

*Primary Examiner* — Victoria H Lynch
(74) *Attorney, Agent, or Firm* — Harness, Dickey & Pierce, P.L.C.

(57) ABSTRACT

A battery temperature control device includes a heating medium circuit that connects a battery heat exchanger, an outside air heat exchanger, a heating medium pump, and a flow rate regulating unit. The outside air heat exchanger is connected in parallel to the battery heat exchanger. The flow rate regulating unit adjusts a flow rate of the heating medium in a first path through which the heating medium flows via at least the outside air heat exchanger and a flow rate of the heating medium in a second path through which the heating medium flows by detouring around the outside air heat exchanger. The control unit controls the flow rate regulating unit to adjust a ratio between a flow rate of the heating medium in the first path and a flow rate of the heating medium in the second path.

8 Claims, 13 Drawing Sheets

(51) Int. Cl.
*H01M 10/48* (2006.01)
*H01M 10/613* (2014.01)
*H01M 10/615* (2014.01)
*H01M 10/625* (2014.01)
*H01M 10/6563* (2014.01)
*H01M 10/6568* (2014.01)

(52) U.S. Cl.
CPC ....... *H01M 10/613* (2015.04); *H01M 10/615* (2015.04); *H01M 10/625* (2015.04); *H01M 10/6563* (2015.04); *H01M 10/6568* (2015.04); *H01M 2220/20* (2013.01)

(58) Field of Classification Search
CPC ............... H01M 10/625; H01M 10/63; H01M 10/6563; H01M 10/6568; H01M 2220/20; Y02E 60/10
See application file for complete search history.

(56) References Cited

FOREIGN PATENT DOCUMENTS

| | | |
|---|---|---|
| JP | 2019023059 A | 2/2019 |
| JP | 2020037881 A | 3/2020 |
| WO | WO-2011015426 A1 | 2/2011 |
| WO | WO-2019058838 A1 | 3/2019 |

* cited by examiner

BATTERY TEMPERATURE CONTROL DEVICE

CROSS REFERENCE TO RELATED APPLICATION

The present application is a continuation application of International Patent Application No. PCT/JP2021/013625 filed on Mar. 30, 2021, which designated the U.S. and claims the benefit of priority from Japanese Patent Application No. 2020-065853 filed on Apr. 1, 2020. The entire disclosures of all of the above applications are incorporated herein by reference.

TECHNICAL FIELD

The present disclosure relates to a battery temperature control device configured to control a temperature of a battery using a heating medium circuit in which a heating medium circulates.

BACKGROUND ART

A battery temperature control device includes a heating medium circuit. An in-vehicle temperature control device includes a low-temperature water circuit that circulates low-temperature chilling water as a heating medium, and adjusts temperature of a battery by circulating low-temperature chilling water.

SUMMARY

A battery temperature control device according to an aspect of the present disclosure includes a heating medium circuit, a control unit, a battery temperature acquisition unit, and a common flow path temperature acquisition unit. The heating medium circuit connects a battery heat exchanger that exchanges heat between a battery and a heating medium, an outside air heat exchanger that is connected in parallel to the battery heat exchanger and exchanges heat between the heating medium and outside air, a heating medium pump that pumps and circulates the heating medium, and a flow rate regulating unit that adjusts a flow rate of the heating medium in a first path through which the heating medium flows via at least the outside air heat exchanger and a flow rate of the heating medium in a second path through which the heating medium flows by detouring around the outside air heat exchanger, and that circulates the heating medium. The control unit controls an operation of the flow rate regulating unit. The battery temperature acquisition unit acquires a battery temperature that is a temperature of the battery. The common flow path temperature acquisition unit acquires a common flow path temperature that is a temperature of the heating medium flowing through a common flow path common to both the first path and the second path. When an outside air temperature that is a temperature of the outside air is a low temperature environment lower than a predetermined reference outside air temperature, the control unit controls an operation of the flow rate regulating unit to adjust a flow rate ratio between a flow rate of the heating medium in the first path and a flow rate of the heating medium in the second path so that the battery temperature is a predetermined reference temperature.

BRIEF DESCRIPTION OF THE DRAWINGS

The above and other objects, features, and advantages of the present disclosure will become more apparent from the following detailed description with reference to the accompanying drawings. In the accompanying drawings.

DESCRIPTION OF EMBODIMENTS

Figure 1:
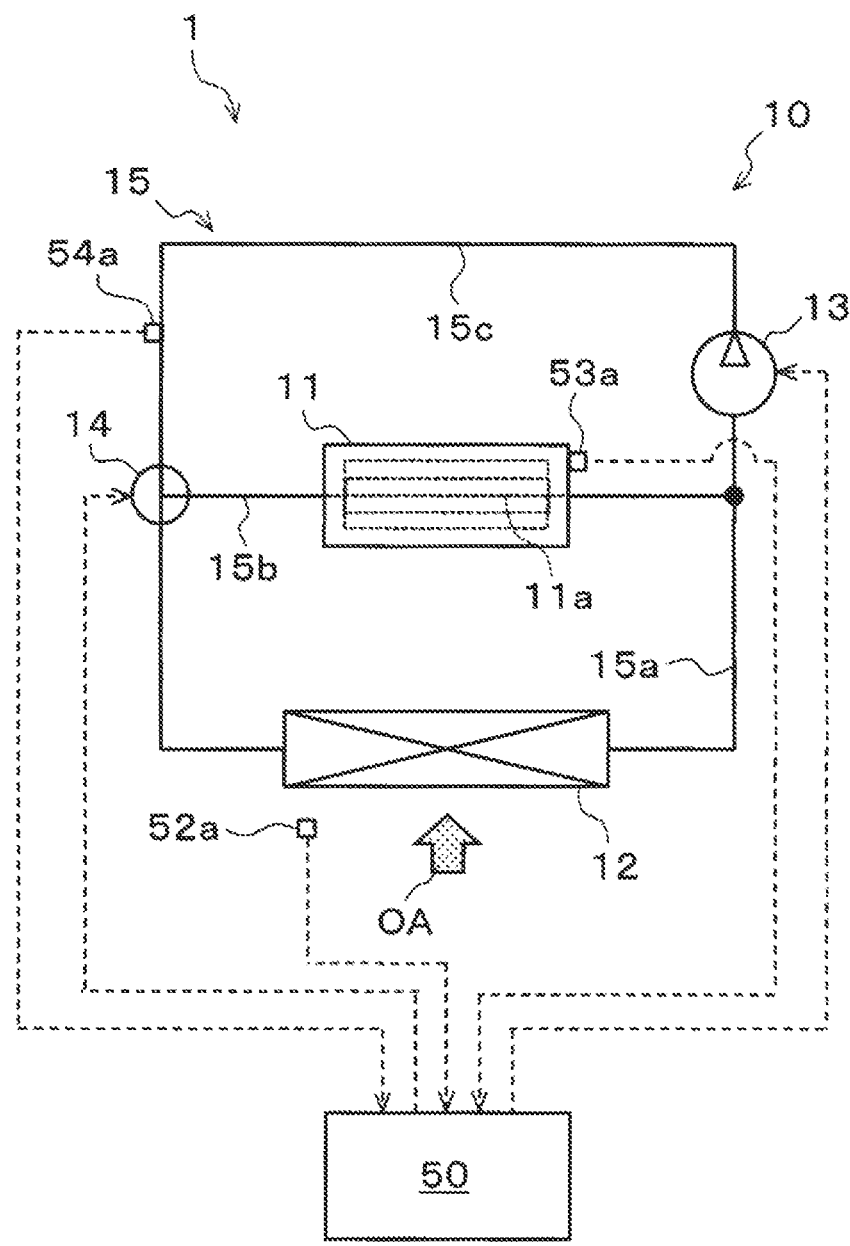
FIG. 1 is an overall configuration diagram of a battery temperature control device according to the first embodiment.

To begin with, examples of relevant techniques will be described.

A battery temperature control device includes a heating medium circuit. An in-vehicle temperature control device includes a low-temperature water circuit that circulates low-temperature chilling water as a heating medium, and adjusts temperature of a battery by circulating low-temperature chilling water.

A sub radiator is disposed in the low-temperature water circuit. Therefore, the battery can be chilled by transferring the heat generated in the battery to the sub radiator through the low-temperature chilling water and dissipating the heat to the outside air.

In the case where the temperature of the battery is adjusted using the heat exchange with the outside air in the sub radiator, when the outside air has a low temperature (for example, 0° C. or lower), the low-temperature chilling water is excessively chilled in the sub radiator, and the battery is chilled to the extent that the temperature falls below the proper temperature range.

When the battery is excessively chilled, it is considered that the output of the battery itself is reduced. In addition, when the temperature difference between the battery and the low-temperature chilling water is too large, it is considered that the temperature in each cell of the battery varies, which causes deterioration of the battery.

Furthermore, in a case where the outside air has an extremely low temperature (for example, −10° C. or lower), when the battery temperature is much lower than the appropriate temperature, for example, 0° C. or lower, the decrease in the output of the battery is more remarkable. In addition, it is considered that the temperature difference between the battery and the low-temperature chilling water is larger, and the above-described battery deterioration is further accelerated.

The present disclosure provides a battery temperature control device capable of suppressing occurrence of a decrease in output and the like in a battery when temperature adjustment of the battery is performed using heat exchange with outside air in an environment where the outside air has a low temperature.

A battery temperature control device according to an aspect of the present disclosure includes a heating medium circuit, a control unit, a battery temperature acquisition unit, and a common flow path temperature acquisition unit.

The heating medium circuit connects a battery heat exchanger that exchanges heat between a battery and a heating medium, an outside air heat exchanger that is connected in parallel to the battery heat exchanger and exchanges heat between the heating medium and outside air, a heating medium pump that pumps and circulates the heating medium, and a flow rate regulating unit that adjusts a flow rate of the heating medium in a first path through which the heating medium flows via at least the outside air heat exchanger and a flow rate of the heating medium in a second path through which the heating medium flows by detouring around the outside air heat exchanger, and that circulates the heating medium.

The control unit controls an operation of the flow rate regulating unit. The battery temperature acquisition unit acquires a battery temperature that is a temperature of the battery. The common flow path temperature acquisition unit acquires a common flow path temperature that is a temperature of the heating medium flowing through a common flow path common to both the first path and the second path.

When an outside air temperature that is a temperature of the outside air is a low temperature environment lower than a predetermined reference outside air temperature, the control unit controls an operation of the flow rate regulating unit to adjust a flow rate ratio between a flow rate of the heating medium in the first path and a flow rate of the heating medium in the second path so that the battery temperature is a predetermined reference temperature.

According to this, in the case of a low temperature environment, by adjusting the flow rate of the heating medium flowing through the first path, the ratio of the heating medium chilled by heat exchange with the outside air to the heating medium circulating in the heating medium circuit can be appropriately adjusted. As a result, the battery temperature control device can suppress an excessive decrease in temperature of the heating medium flowing through the battery heat exchanger even in a low temperature environment, and can suppress a decrease in output and deterioration of the battery.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

First, the first embodiment of the present disclosure will be described with reference to the drawings. In the first embodiment, a battery temperature control device according to the present disclosure is disposed in an electric vehicle that obtains driving force for vehicle traveling from a traveling electric motor. In the battery temperature control device, a battery B mounted on the electric vehicle is subjected to temperature adjustment.

As illustrated in FIG. 1, the battery temperature control device 1 according to the first embodiment includes a heating medium circuit 10, and adjusts the temperature of the battery B by circulating the heating medium of the heating medium circuit 10. Examples of the heating medium of the heating medium circuit 10 may include a solution containing ethylene glycol, an antifreeze liquid, or the like.

The heating medium circuit 10 is configured by connecting the battery heat exchanger 11, an outside air heat exchanger 12, a heating medium pump 13, and a flow rate adjustment valve 14 by a heating medium circulation flow path 15. The heating medium pump 13 is a heating medium pump that pumps the heating medium having passed through at least one of the battery heat exchanger 11 and the outside air heat exchanger 12 to the flow rate adjustment valve 14 in the heating medium circuit 10. The heating medium pump 13 is an electric pump whose rotation speed (that is, pressure feeding capability) is controlled by a control voltage output from a control device 50.

The heating medium flow inlet port of the flow rate adjustment valve 14 is connected to the discharge port of the heating medium pump 13. The flow rate adjustment valve 14 is configured by an electric three-way flow rate adjustment valve having three flow inlet/outlet ports. The heating medium flow inlet port of the outside air heat exchanger 12 is connected to one of the heating medium flow outlet ports of the flow rate adjustment valve 14. The flow inlet port of the heating medium passage 11a of the battery heat exchanger 11 is connected to the other of the heating medium flow outlet ports of the flow rate adjustment valve 14. As shown in FIG. 1, in the heating medium circuit 10 according to the first embodiment, the battery heat exchanger 11 and the outside air heat exchanger 12 are connected in parallel to each other with respect to the flow of the heating medium.

The flow rate adjustment valve 14 continuously changes the opening areas of the one heating medium flow outlet port and the other heating medium flow outlet port according to the control signal from the control device 50. Therefore, the flow rate adjustment valve 14 can continuously adjust the flow rate ratio between the flow rate of the heating medium flowing through the battery heat exchanger 11 and the flow rate of the heating medium flowing through the outside air heat exchanger 12 with respect to the heating medium pumped by the heating medium pump 13 in the heating medium circuit 10.

The battery heat exchanger 11 is a heat exchanger for adjusting the temperature of the battery B by exchanging heat between the heating medium flowing through the heating medium passage 11a and the battery cell Bc constituting the battery B. The heating medium passage 11a in the battery heat exchanger 11 has a passage configuration in which a plurality of passages is connected in parallel inside the dedicated case of the battery B.

Here, the battery B supplies electric power to various electric devices in an electric vehicle, and is, for example, a chargeable/dischargeable secondary battery (in the present embodiment, a lithium ion battery). The battery B is a so-called assembled battery formed by stacking and disposing a plurality of battery cells Bc and electrically connecting these battery cells Bc in series or in parallel.

In this type of battery B, the internal resistance increases and the output tends to decrease at a low temperature, and the deterioration of each battery cell Bc tends to progress at a high temperature. Since the battery B generates heat during charging and discharging, the temperature of the battery B is required to be maintained within an appropriate temperature range (for example, 10° C. or higher and 40° C. or lower) in which the charge and discharge capacity of the battery B can be sufficiently utilized.

As described above, since the heating medium passage 11a of the battery heat exchanger 11 has the passage configuration connected in parallel, the waste heat of the battery B can be uniformly absorbed from the entire area of the battery B.

Such a battery heat exchanger 11 may be formed by disposing the heating medium passage 11a between the stacked battery cells Bc. The battery heat exchanger 11 may be formed integrally with the battery B. For example, the heating medium passage 11a may be provided in a dedicated case that accommodates the stacked battery cells Bc so as to be formed integrally with the battery B.

The outside air heat exchanger 12 is a heat exchanger that exchanges heat between the heating medium flowing out from one flow outlet port of the flow rate adjustment valve 14 and the outside air OA blown by the outside air fan (not illustrated). The outside air heat exchanger 12 is disposed at the front of the inside of the drive device chamber of the electric vehicle. Therefore, when the vehicle travels, the traveling wind can be applied to the outside air heat exchanger 12.

As shown in FIG. 1, both the flow outlet port of the heating medium passage 11a of the battery heat exchanger 11 and the heating medium flow outlet port of the outside air heat exchanger 12 are connected to the suction port of the heating medium pump 13. That is, in the heating medium circuit 10 according to the first embodiment, the heating medium extracted from the battery heat exchanger 11 and the heating medium flowing out of the outside air heat exchanger 12 merge in the process of flowing toward the heating medium pump 13, and are sucked from the suction port of the heating medium pump 13.

The heating medium circuit 10 configured as described above can switch the flow of the heating medium in the heating medium circuit 10 by controlling the operation of the flow rate adjustment valve 14. For example, the flow rate adjustment valve 14 can continuously adjust the flow rate ratio between the flow rate of the heating medium passing through the outside air heat exchanger 12 and the flow rate of the heating medium passing through the heating medium passage 11a of the battery heat exchanger 11 with respect to the flow of the heating medium discharged from the heating medium pump 13.

Specifically, in the heating medium circuit 10, the flow rate adjustment valve 14 can be controlled so that the flow inlet port of the heating medium pump 13 communicates with the flow outlet port of the battery heat exchanger 11, and the flow outlet port of the outside air heat exchanger 12 is closed. In this case, the flow of the heating medium in the heating medium circuit 10 is switched so that the entire amount of the heating medium pumped by the heating medium pump 13 passes through the heating medium passage 11a of the battery heat exchanger 11.

In a case where the circulation of the heating medium is continued in this aspect, the heating medium is heated by the waste heat of the battery B when passing through the battery heat exchanger 11, so that the waste heat of the battery B can be stored in the heating medium.

In the heating medium circuit 10, the flow rate adjustment valve 14 can be controlled so that the flow inlet port of the heating medium pump 13 and the flow outlet port of the outside air heat exchanger 12 communicate with each other and the flow outlet port of the battery heat exchanger 11 is closed. In this case, the flow of the heating medium in the heating medium circuit 10 is switched so that the entire amount of the heating medium pumped by the heating medium pump 13 passes through the outside air heat exchanger 12.

According to this aspect, since all the heating medium in the heating medium circuit 10 can be supplied to the outside air heat exchanger 12, heat can be absorbed from the outside air OA to the heating medium when the temperature of the heating medium is lower than the outside air temperature. Accordingly, the outside air OA can be used as a heat source. On the other hand, when the temperature of the heating medium is higher than the outside air temperature, the heat of the heating medium can be dissipated to the outside air OA. That is, the battery temperature control device 1 can adjust the temperature of the battery B by using the heating medium circuit 10.

Here, in the heating medium circuit 10 according to the first embodiment, the battery heat exchanger 11, the outside air heat exchanger 12, the heating medium pump 13, and the flow rate adjustment valve 14 are connected via the heating medium circulation flow path 15. As illustrated in FIG. 1, the heating medium circulation flow path 15 includes a first flow path 15a, a second flow path 15b, and a common flow path 15c.

The first flow path 15a is a heating medium flow path connected to one of the flow outlet ports of the flow rate adjustment valve 14. Therefore, the outside air heat exchanger 12 is disposed in the first flow path 15a of the heating medium circuit 10 according to the first embodiment.

The second flow path 15b is a heating medium flow path connected to the other of the flow outlet ports of the flow rate adjustment valve 14. Therefore, the battery heat exchanger 11 is disposed in the second flow path 15b of the heating medium circuit 10 according to the first embodiment.

As shown in FIG. 1, the end portion of the first flow path 15a, the end portion of the second flow path 15b, and further the end portion of the common flow path 15c are connected to the suction port of the heating medium pump 13 in the heating medium circuit 10. That is, the connection portion of the first flow path 15a, the second flow path 15b, and the common flow path 15c constitutes the end portion of each of the first flow path 15a, the second flow path 15b, and the common flow path 15c.

Therefore, the common flow path 15c can be referred to as a heating medium flow path that connects the connection portion between the first flow path 15a and the second flow path 15b with the flow inlet port of the flow rate adjustment valve 14. The heating medium pump 13 is disposed in the common flow path 15c of the heating medium circuit 10 according to the first embodiment.

In the heating medium circuit 10 according to the first embodiment, the heating medium can flow and circulate through the heating medium pump 13, the flow rate adjustment valve 14, the outside air heat exchanger 12, and the heating medium pump 13 in this order by controlling the operation of the flow rate adjustment valve 14. Since the circulation path of the heating medium in this case is constituted by the first flow path 15a and the common flow path 15c, and passes through the outside air heat exchanger 12, it corresponds to a first path.

In the heating medium circuit 10, by controlling the operation of the flow rate adjustment valve 14, the heating medium flows through the heating medium pump 13, the flow rate adjustment valve 14, the battery heat exchanger 11, and the heating medium pump 13 in this order, and can circulate while detouring around the outside air heat exchanger 12. The circulation path of the heating medium in this case is constituted by the second flow path 15b and the common flow path 15c, and corresponds to a second path.

Next, a control system of the battery temperature control device 1 according to the first embodiment will be described with reference to FIG. 1. The control device 50 includes a known microcomputer including a CPU, a ROM, a RAM, and the like, and the peripheral circuit thereof.

The control device 50 performs various calculations and processes based on the control program stored in the ROM, and controls the operations of various devices to be controlled connected to the output ports thereof. The devices to be controlled include the heating medium pump 13, the flow rate adjustment valve 14, and the like.

As illustrated in FIG. 1, a control sensor group for controlling the operation of each component is connected to the input of the control device 50. The control sensor group in the first embodiment includes an outside air temperature sensor 52a, a battery temperature sensor 53a, and a first heating medium temperature sensor 54a. Detection signals of the control sensor group are input to the control device 50.

The outside air temperature sensor 52a is an outside air temperature detection unit that detects a vehicle exterior temperature (outside air temperature) Tam. The outside air temperature sensor 52a is disposed to detect the temperature of the outside air OA supplied to the outside air heat exchanger 12 in the drive device chamber.

The battery temperature sensor 53a is a battery temperature detection unit that detects a battery temperature TBA, which is the temperature of the battery B. The battery temperature sensor 53a includes a plurality of temperature detection units, and detects temperatures at a plurality of locations of the battery B. Therefore, the control device 50 can detect a temperature difference of respective components of the battery B. The battery temperature sensor 53a corresponds to an example of a battery temperature acquisition unit.

Furthermore, the battery temperature TBA is an average value of detection values by a plurality of temperature detection units. The battery temperature sensor 53a may detect the temperature of the heating medium flowing through the battery heat exchanger 11 and estimate the temperature of the battery B based on the temperature of the heating medium.

The first heating medium temperature sensor 54a detects the temperature of the heating medium flowing through the common flow path 15c in the heating medium circuit 10. The first heating medium temperature sensor 54a is disposed between the discharge port of the heating medium pump 13 and the flow inlet port of the flow rate adjustment valve 14 in the common flow path 15c. The first heating medium temperature sensor 54a corresponds to an example of a common flow path temperature acquisition unit, and the heating medium temperature detected by the first heating medium temperature sensor 54a corresponds to a common flow path temperature.

The battery temperature control device 1 refers to the detection results by the outside air temperature sensor 52a, the battery temperature sensor 53a, and the first heating medium temperature sensor 54a, and controls the operations of the heating medium pump 13 and the flow rate adjustment valve 14 so that the battery temperature is a predetermined reference temperature. Thus, a battery temperature control device 1 can suppress a decrease in output and deterioration of the battery using a heating medium circuit 10.

Figure 2:
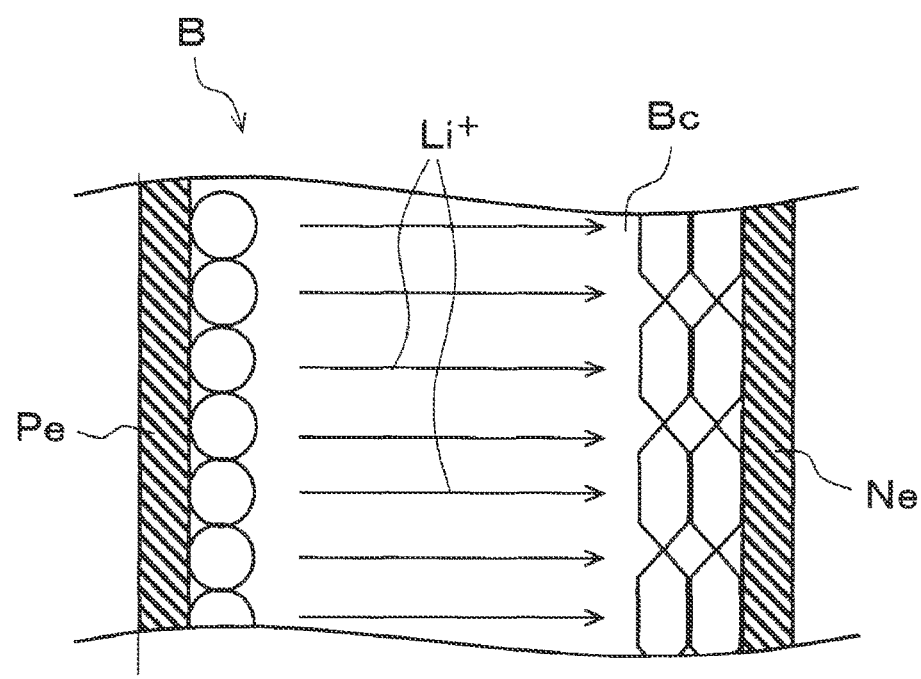
FIG. 2 is an explanatory diagram related to the behavior of lithium ions in a state where there is a temperature difference inside a battery cell.

Here, focusing on the inside of each battery cell Bc, the temperature adjustment of the battery B using the heating medium will be considered. As illustrated in FIG. 2, a positive electrode Pe, a negative electrode Ne, and an electrolyte are disposed inside the battery cell Bc of a battery B that is a lithium ion battery, and lithium ions move between the positive electrode Pe and the negative electrode Ne to perform charging and discharging.

An example of the positive electrode Pe may include a lithium transition metal composite oxide. An example of the negative electrode Ne may include a carbon material, and an example of the electrolyte may include a nonaqueous electrolyte such as an organic solvent.

As described above, when the battery B is charged and discharged, lithium ions move between the positive electrode Pe and the negative electrode Ne via the electrolyte. When the temperature difference in the battery cell Bc is small and is within a predetermined temperature range, it is considered that lithium ions uniformly move between the positive electrode Pe and the negative electrode Ne as illustrated in FIG. 2.

In this regard, when the temperature of a battery B is adjusted using the heating medium circuit 10, a temperature distribution is generated inside a battery cell Bc by heat exchange with the heating medium flowing through the heating medium passage 11a of the battery heat exchanger 11. Of the battery cell Bc, a portion close to the heating medium passage 11a of the battery heat exchanger 11 is more easily affected by the heating medium, and a portion away from the heating medium passage 11a is less affected by the heating medium.

A case where the outside air temperature is extremely low (for example, −10° C. or lower) will be considered. The heating medium of the heating medium circuit 10 exchanges heat with the outside air OA with an extremely low temperature in the outside air heat exchanger 12, and thus is chilled to the same level as the outside air OA. The heating medium chilled to an extremely low temperature flows through the heating medium passage 11a of the battery heat exchanger 11, and absorbs heat from each battery cell Bc of the battery B.

Figure 3:
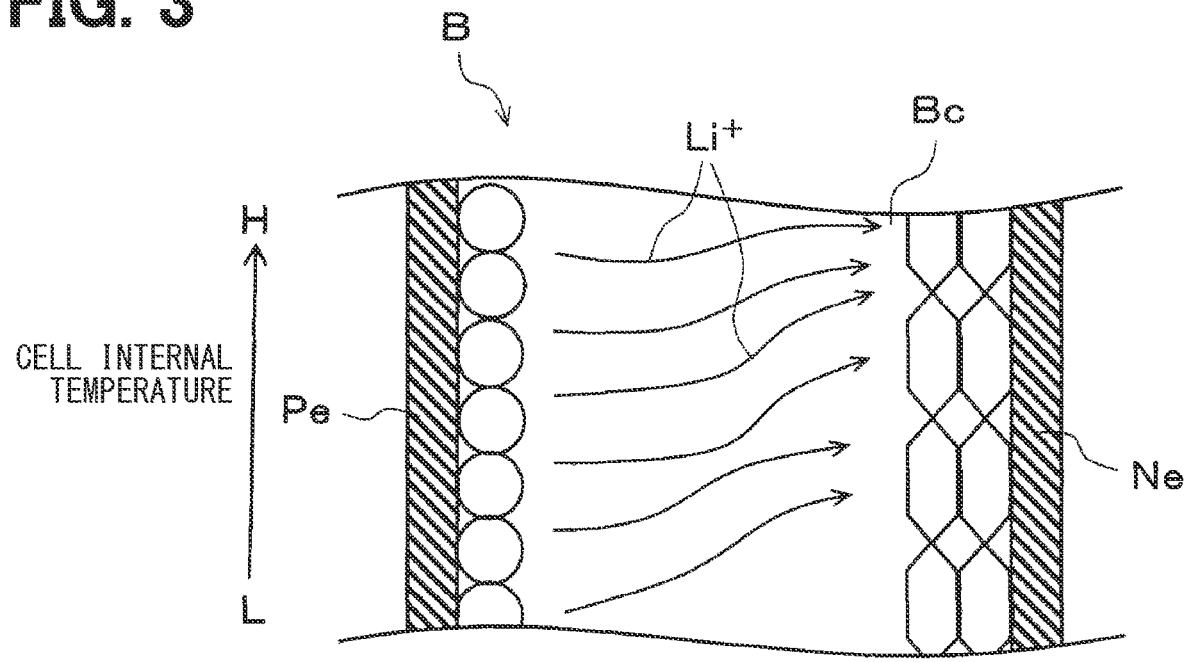
FIG. 3 is an explanatory diagram regarding behavior of lithium ions in a state in which the temperature of the inside of the battery cell is uniform.

In this case, in the battery cell Bc, heat is absorbed by the heating medium from a portion close to the heating medium passage 11a, and the amount of heat absorbed at a portion away from the heating medium passage 11a is small. That is, as shown in FIG. 3, a temperature distribution occurs inside the battery cell Bc, and the temperature difference inside the battery cell Bc increases. In the case of FIG. 3, it is assumed that the heating medium passage 11a through which the heating medium with an extremely low temperature flows is disposed on the lower side in FIG. 3.

A case of charging and discharging the battery cell Bc are performed in a state where a temperature difference occurs inside the battery cell Bc will be considered. When a temperature difference occurs inside the battery cell Bc, it is considered that the salt concentration of the electrolyte inside the battery cell Bc is non-uniform corresponding to the temperature distribution of the inside of the battery cell Bc.

For this reason, at the time of charging and discharging the battery B, as shown in FIG. 3, it is considered that lithium ions are intensively moved to a portion having a high salt concentration in the positive electrode Pe and the negative electrode Ne, and current concentration occurs between the positive electrode Pe and the negative electrode Ne. When current concentration occurs between the positive electrode Pe and the negative electrode Ne, it is expected that local deterioration occurs in the battery B.

The battery temperature control device 1 according to the first embodiment performs control related to temperature adjustment of the heating medium in the heating medium circuit 10 in order to suppress deterioration and a decrease in output due to current concentration in the battery cell Bc when the heating medium circuit 10 adjusts the temperature of the battery B.

Figure 4:
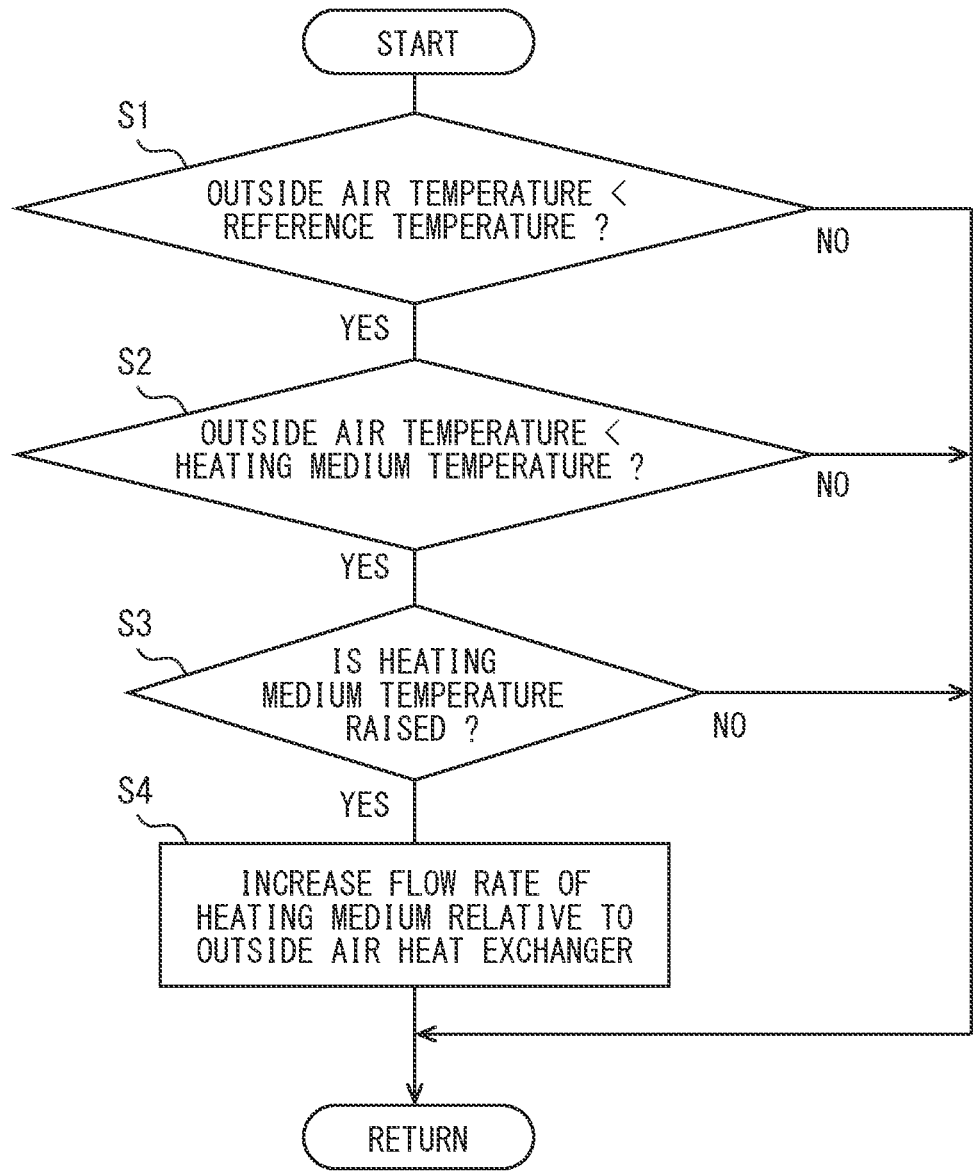
FIG. 4 is a flowchart related to control of the flow rate adjustment valve according to the first embodiment.

FIG. 4 illustrates the control content for suppressing local deterioration and a decrease in output of battery B in an environment where the outside air OA has a low temperature. The control program according to FIG. 4 is executed by the control device 50 before charge and discharge of the battery B is performed or when charge and discharge of the battery B is started.

First, in step S1, it is determined whether the outside air temperature detected by the outside air temperature sensor 52a is lower than a predetermined reference outside air temperature. Here, the reference outside air temperature is an outside air temperature determined to correspond to a battery temperature (for example, 10° C.) at which a sufficient output can be obtained from the battery B and warm-up of the battery B is unnecessary, for example, 0° C.

That is, in step S1, it is determined whether the outside air is in a low temperature environment. When it is determined that the outside air temperature is lower than the reference outside air temperature, the process proceeds to step S2. On the other hand, when it is determined that the outside air temperature is equal to or higher than the reference outside air temperature, the control program illustrated in FIG. 4 is once terminated and executed again.

In step S2, it is determined whether the outside air temperature detected by the outside air temperature sensor 52a is lower than the heating medium temperature detected by the first heating medium temperature sensor 54a. The heating medium temperature detected by the first heating medium temperature sensor 54a is a temperature of the heating medium flowing through the common flow path 15c, and corresponds to a common flow path temperature.

When it is determined that the outside air temperature is lower than the heating medium temperature, the process proceeds to step S3. On the other hand, when it is determined that the outside air temperature is equal to or higher than the heating medium temperature, the control program illustrated in FIG. 4 is once terminated and executed again.

In step S3, it is determined whether the heating medium temperature detected by the first heating medium temperature sensor 54a has increased. For example, for the detection result of the first heating medium temperature sensor 54a, the determination in step S3 is performed by comparing the previous detection result with the current detection result. In other words, in step S3, it is determined whether the temperature of the heating medium flowing through the common flow path 15c has increased.

When it is determined that the heating medium temperature detected by the first heating medium temperature sensor 54a has increased, the process proceeds to step S4. On the other hand, when it is determined that the temperature has not increased, the control program illustrated in FIG. 4 is once terminated and executed again.

In step S4, the operation of the flow rate adjustment valve 14 is controlled so as to increase the flow rate of the heating medium in the first flow path 15a to the outside air heat exchanger 12 and to decrease the flow rate of the heating medium in the second flow path 15b to the battery heat exchanger 11. As a result, the flow rate ratio in the flow rate adjustment valve 14 is adjusted so that the flow rate of the heating medium flowing through the outside air heat exchanger 12 increases.

At this time, the opening degrees of the flow outlet port of the flow rate adjustment valve 14 on the outside air heat exchanger 12 side and the flow outlet port of the flow rate adjustment valve 14 on the battery heat exchanger 11 side are determined so that the battery temperature approaches a predetermined value. The predetermined value is a target value determined within an appropriate temperature range (for example, 15° C. or higher and 55° C. or lower) in the battery B.

Specifically, the opening degree of the flow outlet port of the flow rate adjustment valve 14 on the outside air heat exchanger 12 side is determined to increase as the heating medium temperature detected by the first heating medium temperature sensor 54a increases. That is, the larger the temperature difference between the heating medium temperature and the predetermined value, the larger the opening degree of the flow outlet port on the outside air heat exchanger 12 side is determined to be.

At this time, the opening degree of the flow outlet port of the flow rate adjustment valve 14 on the battery heat exchanger 11 side is determined to decrease as the heating medium temperature detected by the first heating medium temperature sensor 54a increases. That is, the larger the temperature difference between the heating medium temperature and the predetermined value increases, the smaller the opening degree of the flow outlet port on the battery heat exchanger 11 side is determined to be. Thereafter, the control program of FIG. 4 is once terminated and executed again.

Here, in the heating medium circuit 10, the heating medium chilled by heat exchange with the outside air with a low temperature at the outside air heat exchanger 12 and the heating medium having passed through the battery heat exchanger 11 are mixed in the process of flowing through the common flow path 15c. Therefore, with respect to the flow rate ratio between the flow rate of the heating medium through the battery heat exchanger 11 and the flow rate of the heating medium through the outside air heat exchanger 12, the flow rate through the outside air heat exchanger 12 is adjusted to be large and the flow rate through the battery heat exchanger 11 is adjusted to be small, so that the temperature of the heating medium flowing through the common flow path 15c can be lowered.

The heating medium having passed through the common flow path 15c is distributed to the battery heat exchanger 11 and the outside air heat exchanger 12 by the flow rate adjustment valve 14. Therefore, the magnitude of the temperature difference between the heating medium flowing through the battery heat exchanger 11 and each battery cell Bc of the battery B can be adjusted by adjusting the temperature of the heating medium flowing through the common flow path 15c.

As a result, the temperature difference between the temperature of the heating medium through the battery heat exchanger 11 and the battery temperature of the battery B can be reduced, so that the occurrence of power concentration in each battery cell Bc of the battery B can be suppressed. As a result, even in an environment where the outside air has a low temperature, it is possible to suppress a decrease in output and deterioration of the battery B due to a temperature difference in the battery cell Bc with respect to temperature adjustment of the battery B using heat exchange with the outside air OA.

In step S4, the opening degree of the flow outlet port of the flow rate adjustment valve 14 on the outside air heat exchanger 12 side may be determined to decrease as the heating medium temperature detected by the first heating medium temperature sensor 54a decreases. In this case, the opening degree of the flow outlet port of the flow rate adjustment valve 14 on the battery heat exchanger 11 side is determined to increase as the heating medium temperature decreases.

As described above, according to the battery temperature control device 1 of the first embodiment, when the temperature of the battery B is adjusted by heat exchange with outside air in a low temperature environment, the operation of the flow rate adjustment valve 14 is controlled according to the control program illustrated in FIG. 4.

As a result, even in an environment where the outside air temperature is lower than the reference outside air temperature, the battery temperature control device 1 can adjust the flow rate ratio between the flow rate of the heating medium through the outside air heat exchanger 12 and the flow rate of the heating medium through the battery heat exchanger 11 to adjust the battery temperature of the battery B to a predetermined reference temperature.

As a result, the battery temperature control device 1 according to the first embodiment can suppress temperature fluctuation of the heating medium flowing through the battery heat exchanger 11 even in a low temperature environment, and can suppress a decrease in output and deterioration of the battery B due to the influence of the outside air OA with a low temperature.

Further, when controlling the operation of the flow rate adjustment valve 14 according to the control program illustrated in FIG. 4, the battery temperature control device 1 according to the first embodiment perform control to increase the flow rate of the heating medium through the outside air heat exchanger 12 as the heating medium temperature detected by the first heating medium temperature sensor 54a increases.

Thus, according to the battery temperature control device 1, it is possible to appropriately adjust the flow rate ratio of between the heating medium through the battery heat exchanger 11 and the heating medium through the outside air heat exchanger 12 according to the situation of the temperature of the heating medium flowing through the common flow path 15c, and it is possible to suppress the deterioration and the decrease in output of the battery B due to the influence of the outside air with a low temperature.

As shown in FIG. 1, in the heating medium circuit 10 of the battery temperature control device 1 according to the first embodiment, the heating medium pump 13 is disposed in the common flow path 15c common to a circulation path of the heating medium through the battery heat exchanger 11 and a circulation path of the heating medium through the outside air heat exchanger 12. Therefore, according to the battery temperature control device 1, the circulation of the heating medium through the battery heat exchanger 11 and the circulation of the heating medium through the outside air heat exchanger 12 can be realized by the operation of one heating medium pump 13.

Second Embodiment

Next, the second embodiment different from the first embodiment will be described with reference to FIGS. 5 to 9. In the second embodiment, the battery temperature control device 1 according to the present disclosure is applied to a battery temperature control device with a cabin interior air-conditioning function. The battery temperature control device 1 according to the second embodiment includes a heating medium circuit 10, a refrigeration cycle 20, a heating unit 30, a cabin air-conditioning unit 40, a control device 50, and the like, and air conditions the interior of the cabin which is a space to be air-conditioned in addition to temperature adjustment of the battery B mounted on the electric vehicle.

The battery temperature control device 1 according to the second embodiment can switch between a cooling mode, a heating mode, and a dehumidifying/heating mode as an air-conditioning operation mode for air conditioning the interior of the cabin. The cooling mode is an operation mode in which the blast air blown into the cabin is chilled and blown into the cabin. The heating mode is an operation mode in which the blast air is heated and blown into the cabin. The dehumidifying/heating mode is an operation mode in which dehumidifying and heating the interior of the cabin is performed by reheating the chilled and dehumidified blast air and blowing the heated air into the cabin.

The battery temperature control device 1 can switch presence and absence of chilling of the battery B using a refrigeration cycle 20 regardless of the state of the air-conditioning operation mode. Therefore, the operation mode of the refrigeration cycle 20 in the battery temperature control device 1 can be defined by a combination of the state of the air-conditioning operation mode and the presence or absence of chilling of the battery B. Therefore, the operation modes of the battery temperature control device 1 includes seven operation modes including a cooling mode, a heating mode, a dehumidifying/heating mode, a single chilling mode, a chilling/cooling mode, a chilling/heating mode, and a chilling/dehumidifying/heating mode.

The single chilling mode is an operation mode in which the battery B is chilled using the refrigeration cycle 20 without air-conditioning the interior of the cabin. The chilling/cooling mode is an operation mode in which the interior of the cabin is cooled and the battery B is chilled using the refrigeration cycle 20. The chilling/heating mode is an operation mode in which the interior of the cabin is heated and the battery B is chilled using the refrigeration cycle 20. The chilling/dehumidifying/heating mode is an operation mode in which the interior of the cabin is dehumidified and heated, and the battery B is chilled using the refrigeration cycle 20.

In the refrigeration cycle 20 of the battery temperature control device 1, an HFC refrigerant (Specifically, R134a) is employed as the refrigerant to constitute a subcritical refrigeration cycle in which a high-pressure side refrigerant pressure does not exceed a critical pressure of the refrigerant. Refrigerating machine oil for lubricating a compressor 21 is mixed in the refrigerant. An example of the refrigerating machine oil includes a PAG oil (polyalkylene glycol oil) having compatibility with a liquid-phase refrigerant. Part of the refrigerating machine oil circulates in the cycle together with the refrigerant.

Figure 5:
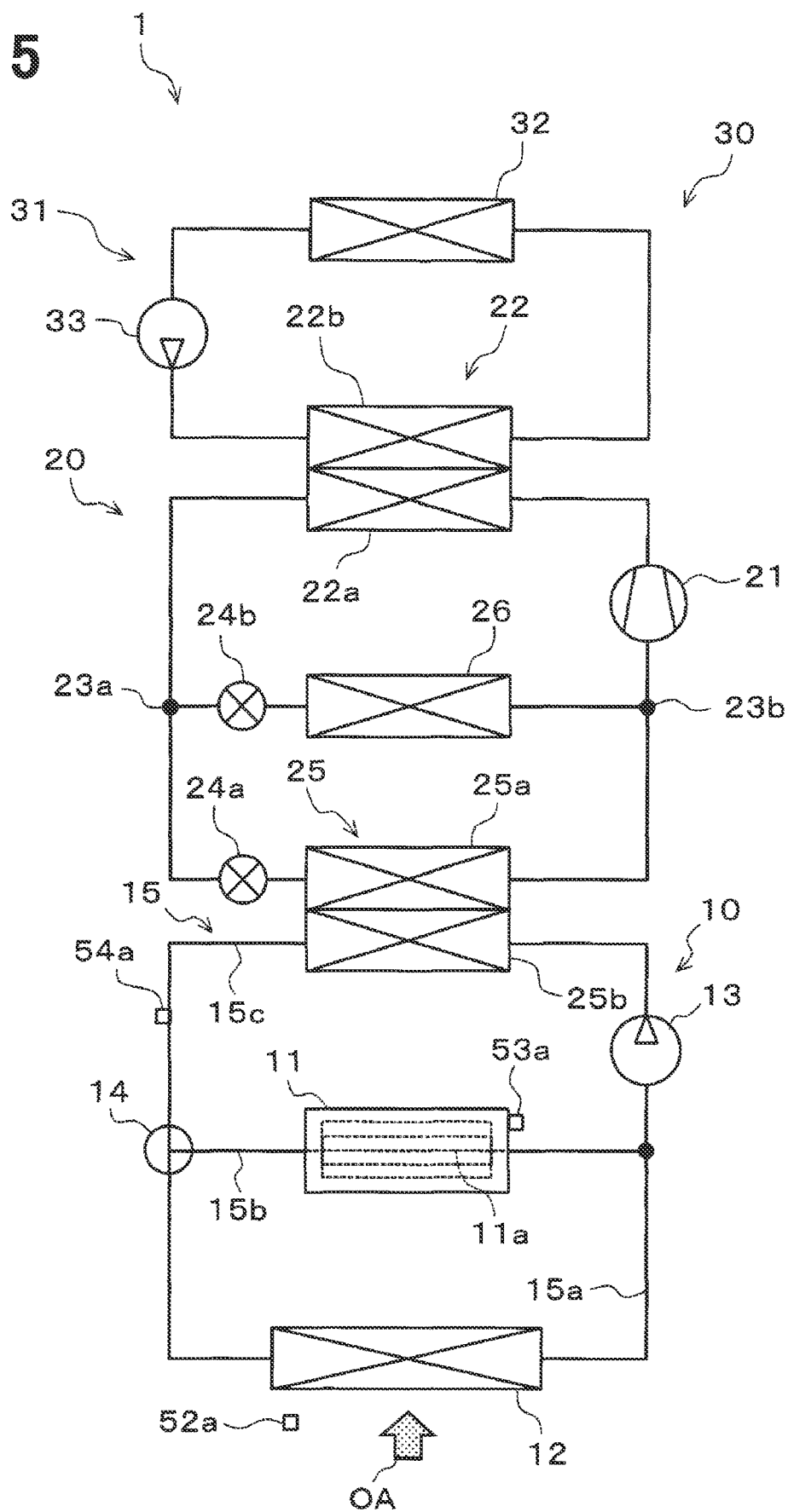
FIG. 5 is an overall configuration diagram of a battery temperature control device according to the second embodiment.

Next, each component constituting the refrigeration cycle 20 in the battery temperature control device 1 according to the second embodiment will be described. The refrigeration cycle 20 is a vapor compression refrigeration cycle device. As illustrated in FIG. 5, the refrigeration cycle 20 includes a compressor 21, a heating medium refrigerant heat exchanger 22, a first expansion valve 24a, a second expansion valve 24b, a chiller 25, and an air-conditioning evaporator 26.

In the refrigeration cycle 20, the compressor 21 sucks, compresses, and discharges the refrigerant. The compressor 21 is disposed in a vehicle hood. The compressor 21 is an electric compressor in which a fixed capacity type compression mechanism having a fixed discharge capacity is rotationally driven by an electric motor. The rotation speed (that is, refrigerant discharge capacity) of the compressor 21 is controlled by a control signal output from the control device 50.

The inlet of a refrigerant passage 22a of the heating medium refrigerant heat exchanger 22 is connected to the discharge port of the compressor 21. The heating medium refrigerant heat exchanger 22 is a heat exchanger that radiates heat of the high pressure refrigerant discharged from the compressor 21 to the high-temperature side heating medium of a high-temperature side heating medium circuit 31 constituting the heating unit 30 to heat the high-temperature side heating medium.

The heating medium refrigerant heat exchanger 22 includes the refrigerant passage 22a through which the refrigerant of the refrigeration cycle 20 flows, and a heating medium passage 22b through which the high-temperature side heating medium of the high-temperature side heating medium circuit 31 flows. The heating medium refrigerant heat exchanger 22 is formed of the same kind of metal (for example, an aluminum alloy) having excellent heat conductivity, and the respective constituent members are integrated by brazing.

Accordingly, the high pressure refrigerant flowing through the refrigerant passage 22a and the high-temperature side heating medium flowing through the heating medium passage 22b can exchange heat with each other. The heating medium refrigerant heat exchanger 22 is an example of a condenser that radiates heat of the high pressure refrigerant, and constitutes part of a heating unit 30 described later.

A refrigerant branch portion 23a having a three-way joint structure is connected to the outlet of the refrigerant passage 22a of the heating medium refrigerant heat exchanger 22. The refrigerant branch portion 23a branches the flow of the liquid-phase refrigerant flowing out of the heating medium refrigerant heat exchanger 22. In the refrigerant branch portion 23a, one of the three flow inlet/outlet ports is the refrigerant flow inlet port, and the remaining two are refrigerant flow outlet ports.

The refrigerant inlet of the chiller 25 is connected to one refrigerant flow outlet port of the refrigerant branch portion 23a via the first expansion valve 24a. The refrigerant inlet of the air-conditioning evaporator 26 is connected to the other refrigerant flow outlet port of the refrigerant branch portion 23a via the second expansion valve 24b.

The first expansion valve 24a is a decompression unit that decompresses the refrigerant flowing out of the one refrigerant flow outlet port of the refrigerant branch portion 23a in an operation mode or a heating mode in which the battery B is chilled using at least the refrigeration cycle 20. The first expansion valve 24a is an electric variable throttle mechanism, and includes a valve body and an electric actuator. That is, the first expansion valve 24a is configured by a so-called electric expansion valve, and corresponds to an example of a first decompression unit.

The valve body of the first expansion valve 24a is configured to be able to change a passage opening degree (in other words, a throttle opening degree) of the refrigerant passage. The electric actuator includes a stepping motor that changes the throttle opening degree of the valve body. The operation of the first expansion valve 24a is controlled by a control signal output from the control device 50.

The first expansion valve 24a includes a variable throttle mechanism having a fully open function of fully opening the refrigerant passage when the throttle opening degree is fully opened and a fully closed function of closing the refrigerant passage when the throttle opening degree is fully closed. That is, the first expansion valve 24a can prevent the decompressing action of refrigerant by fully opening the refrigerant passage.

The first expansion valve 24a closes the refrigerant passage to block the inflow of the refrigerant into the chiller 25. That is, the first expansion valve 24a has both a function as a decompression unit that decompresses the refrigerant and a function as a refrigerant circuit switch unit that switches the refrigerant circuit.

The refrigerant inlet of the chiller 25 is connected to the outlet of the first expansion valve 24a. The chiller 25 is a heat exchanger that exchanges heat between the low pressure refrigerant decompressed by the first expansion valve 24a and the heating medium circulating in the heating medium circuit 10.

The chiller 25 includes a refrigerant passage 25a through which the low pressure refrigerant decompressed by the first expansion valve 24a flows, and a heating medium passage 25b through which the heating medium circulating in the heating medium circuit 10 flows. Therefore, the chiller 25 is an evaporator that evaporates the low pressure refrigerant by heat exchange between the low pressure refrigerant flowing through the refrigerant passage 25a and the heating medium flowing through the heating medium passage 25b to absorb heat from the heating medium.

As illustrated in FIG. 1, the second expansion valve 24b is connected to the other refrigerant flow outlet port of the refrigerant branch portion 23a. The second expansion valve 24b is a decompression unit that decompresses the refrigerant flowing out of the other refrigerant flow outlet port of the refrigerant branch portion 23a in the operation mode of chilling the blast air using at least the refrigeration cycle 20. The second expansion valve 24b corresponds to an example of a second decompression unit.

As in the first expansion valve 24a, the second expansion valve 24b is an electric variable throttle mechanism, and includes a valve body and an electric actuator. That is, the second expansion valve 24b is configured by a so-called electric expansion valve, and has a fully open function and a fully closed function.

That is, the second expansion valve 24b can prevent the decompressing action of refrigerant by fully opening the refrigerant passage. The second expansion valve 24b closes the refrigerant passage to block the inflow of the refrigerant into the air-conditioning evaporator 26. That is, the second expansion valve 24b has both a function as a decompression unit that decompresses the refrigerant and a function as a refrigerant circuit switch unit that switches the refrigerant circuit.

Figure 6:
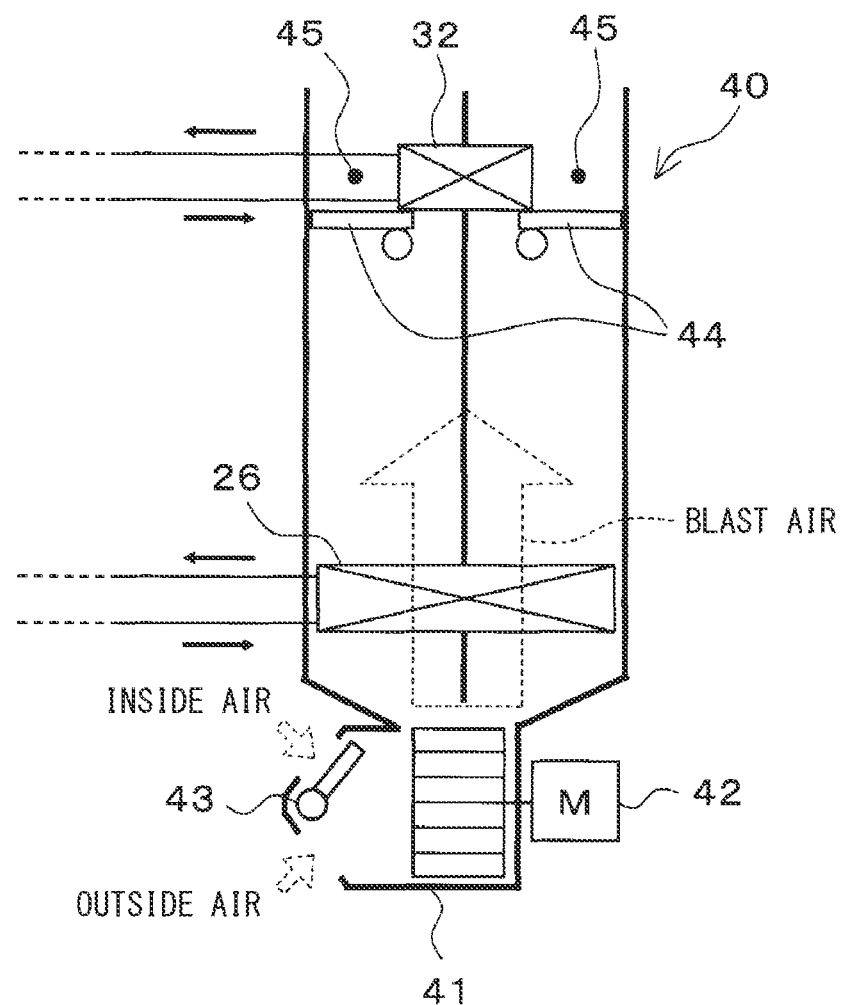
FIG. 6 is a configuration diagram of a cabin air-conditioning unit according to the second embodiment.

The refrigerant inlet of the air-conditioning evaporator 26 is connected to the outlet of the second expansion valve 24b. The air-conditioning evaporator 26 is an evaporator that exchanges heat between the low pressure refrigerant decompressed by the second expansion valve 24b and the blast air W to evaporate the low pressure refrigerant and chill the blast air W in the cooling mode or the dehumidifying/heating mode. As illustrated in FIG. 6, the air-conditioning evaporator 26 is disposed in a casing 41 of the cabin air-conditioning unit 40. The air-conditioning evaporator 26 corresponds to an example of an air-conditioning heat exchange unit.

As illustrated in FIG. 1, the other refrigerant inlet of a refrigerant merging portion 23b is connected to the refrigerant outlet of the chiller 25. The one refrigerant inlet of the refrigerant merging portion 23b is connected to the refrigerant outlet of the air-conditioning evaporator 26. Here, as in the refrigerant branch portion 23a, the refrigerant merging portion 23b has a three-way joint structure, and has two of the three flow inlet/outlet ports as refrigerant inlets and the remaining one as the refrigerant outlet.

The refrigerant merging portion 23b merges the flow of the refrigerant flowing out of the chiller 25 and the flow of the refrigerant flowing out of the air-conditioning evaporator 26. The suction port of the compressor 21 is connected to the refrigerant outlet of the refrigerant merging portion 23b.

Subsequently, the heating unit 30 of the battery temperature control device 1 according to the second embodiment will be described. The heating unit 30 is configured to heat the blast air W supplied to the space to be air-conditioned using the high pressure refrigerant in the refrigeration cycle 20 as a heat source.

The heating unit 30 according to the second embodiment includes the high-temperature side heating medium circuit 31, and includes the heating medium passage 22b of the heating medium refrigerant heat exchanger 22, a heater core 32, a high-temperature side pump 33, and the like. The high-temperature side heating medium circuit 31 is a heating medium circuit that circulates the high-temperature side heating medium, and a solution containing ethylene glycol, an antifreeze liquid, or the like can be used as the high-temperature side heating medium.

The high-temperature side pump 33 is a heating medium pump that pumps the high-temperature side heating medium in order to circulate the high-temperature side heating medium in the high-temperature side heating medium circuit 31. The high-temperature side pump 33 is an electric pump whose rotation speed (that is, pressure feeding capability) is controlled by a control voltage output from the control device 50. The flow inlet port of the heating medium passage 22b of the heating medium refrigerant heat exchanger 22 is connected to the discharge port of the high-temperature side pump 33.

As described above, in the heating medium passage 22b of the heating medium refrigerant heat exchanger 22, the high-temperature side heating medium is heated by heat exchange with the high pressure refrigerant flowing through the refrigerant passage 22a. That is, the high-temperature side heating medium is heated using the heat pumped up by the refrigeration cycle 20.

The heating medium flow inlet port of the heater core 32 is connected to the flow outlet port of the heating medium passage 22b of the heating medium refrigerant heat exchanger 22. The heater core 32 is a heat exchanger that exchanges heat between the high-temperature side heating medium heated by the heating medium refrigerant heat exchanger 22 and the blast air W having passed through the air-conditioning evaporator 26 to heat the blast air W. As illustrated in FIG. 6, the heater core 32 is disposed in the casing 41 of the cabin air-conditioning unit 40. The suction port of the high-temperature side pump 33 is connected to the heating medium flow outlet port of the heater core 32.

Therefore, the battery temperature control device 1 according to the second embodiment can heat the blast air W via the high-temperature side heating medium using the heat of the high pressure refrigerant pumped up by the refrigeration cycle 20 as a heat source. Therefore, the heating medium refrigerant heat exchanger 22 and the high-temperature side heating medium circuit 31 correspond to an example of a heating unit.

The heating medium circuit 10 of the battery temperature control device 1 according to the second embodiment is configured to be similar to the heating medium circuit 10 according to the first embodiment except that the chiller 25 in the refrigeration cycle 20 is disposed. As illustrated in FIG. 1, the heating medium circuit 10 according to the second embodiment includes the heating medium passage 25b of the chiller 25 in addition to the battery heat exchanger 11, the outside air heat exchanger 12, the heating medium pump 13, and the flow rate adjustment valve 14, as in the first embodiment.

In the second embodiment, the heating medium passage 25b of the chiller 25 is disposed in the common flow path 15c of the heating medium circuit 10. The heating medium flow inlet port of the heating medium passage 25b of the chiller 25 is connected to the discharge port of the heating medium pump 13. The heating medium flow outlet port of the heating medium passage 25b of the chiller 25 is connected to the flow inlet port of the flow rate adjustment valve 14.

Therefore, as in the first embodiment, in the heating medium circuit 10 in the second embodiment, the temperature of the heating medium can be adjusted by heat exchange with the outside air OA in the outside air heat exchanger 12. Furthermore, according to the heating medium circuit 10 of the second embodiment, the heating medium can be chilled by the low pressure refrigerant absorbing heat in the chiller 25 of the refrigeration cycle 20.

Next, the cabin air-conditioning unit 40 of the battery temperature control device 1 according to the second embodiment will be described with reference to FIG. 6. The cabin air-conditioning unit 40 is a unit for blowing the blast air W whose temperature has been adjusted by the refrigeration cycle 20 in the battery temperature control device 1 to an appropriate location of the interior of the cabin. The cabin air-conditioning unit 40 is disposed inside an instrument panel at the foremost part of the interior of the cabin. The cabin air-conditioning unit 40 accommodates a blower 42, the air-conditioning evaporator 26, the heater core 32, and the like in an air passage formed in the casing 41 forming an outer shell thereof. The casing 41 forms an air passage for the blast air W blown into the cabin. The casing 41 is made of resin (Specifically, polypropylene) having a certain degree of elasticity and excellent strength.

As illustrated in FIG. 2, an inside/outside air switch device 43 is disposed on the most upstream side of the casing 41 in the blast air flow direction. The inside/outside air switch device 43 switches between inside air (air inside the cabin) and outside air (air outside the cabin) to introduce the air into the casing 41.

The inside/outside air switch device 43 continuously adjusts the opening areas of the inside air introduction port for introducing the inside air into the casing 41 and the outside air introduction port for introducing the outside air by the inside/outside air switch door to change the introduction ratio between the introduction air volume of the inside air and the introduction air volume of the outside air. The inside/outside air switch door is driven by an electric actuator for the inside/outside air switch door. The operation of the electric actuator is controlled by a control signal output from the control device 50.

The blower 42 is disposed downstream of the inside/outside air switch device 43 in the blast air flow direction. The blower 42 is configured by an electric blower that drives a centrifugal multi-blade fan with an electric motor. The blower 42 blows air sucked through the inside/outside air switch device 43 into the cabin. The rotation speed (that is, blowing capacity) of the blower 42 is controlled by a control voltage output from the control device 50.

The air-conditioning evaporator 26 and the heater core 32 are disposed in this order with respect to the flow of the blast air downstream of the blower 42 in the blast air flow direction. That is, the air-conditioning evaporator 26 is disposed upstream of the heater core 32 in the blast air flow direction.

A cold air bypass passage 45 is formed in the casing 41. The cold air bypass passage 45 is an air passage through which the blast air W having passed through the air-conditioning evaporator 26 flows downstream while detouring around the heater core 32.

An air mixing door 44 is disposed downstream of the air-conditioning evaporator 26 in the blast air flow direction and upstream of the heater core 32 in the blast air flow direction. The air mixing door 44 adjusts an air volume ratio between an air volume passing through the heater core 32 and an air volume passing through the cold air bypass passage 45 of the blast air W having passed through the air-conditioning evaporator 26.

The air mixing door 44 is driven by an electric actuator for driving the air mixing door. The operation of the electric actuator is controlled by a control signal output from the control device 50.

A mixing space is provided downstream of the heater core 32 in the blast air flow direction. In the mixing space, the blast air W heated by the heater core 32 and the blast air W passing through the cold air bypass passage 45 and not heated by the heater core 32 are mixed.

Further, an opening hole through which blast air (conditioned air) mixed in the mixing space is blown into the cabin is disposed in most downstream portion of the casing 41 in the blast air flow direction. As the opening holes, a face opening hole, a foot opening hole, and a defroster opening hole (none of them illustrated) are provided.

The face opening hole is an opening hole for blowing conditioned air toward the upper body of the occupant in the cabin. The foot opening hole is an open hole for blowing conditioned air toward the feet of the occupant. The defroster opening hole is an opening for blowing conditioned air toward the inner face of the windshield.

The face opening hole, the foot opening hole, and the defroster opening hole are connected to a face blow-out port, a foot blow-out port, and a defroster blow-out port (none of them illustrated) provided in the cabin via ducts forming air passages, respectively.

Therefore, the temperature of the conditioned air mixed in the mixing space is adjusted by the air mixing door 44 adjusting the air volume ratio between the air volume passing through the heater core 32 and the air volume passing through the cold air bypass passage 45. As a result, the temperature of the blast air (conditioned air) blown into the cabin from each of the blow-out ports is adjusted.

A face door, a foot door, and a defroster door (none of them illustrated) are disposed upstream of the face opening hole, the foot opening hole, and the defroster opening hole in the blast air flow direction, respectively. The face door adjusts an opening area of the face opening hole. The foot door adjusts an opening area of the foot opening hole. The defroster door adjusts an opening area of the defroster opening hole.

The face door, the foot door, and the defroster door constitute a blow-out mode switch device that switches a blow-out port through which conditioned air is blown. The face door, the foot door, and the defroster door are connected to an electric actuator for driving the blow-out port mode door via a link mechanism or the like and rotated in conjunction therewith. The operation of the electric actuator is controlled by a control signal output from the control device 50.

Next, a control system of the battery temperature control device 1 according to the second embodiment will be described with reference to FIG. 7. As in the first embodiment, the control device 50 according to the second embodiment includes a known microcomputer including a CPU, a ROM, a RAM, and the like, and a peripheral circuit thereof.

The control device 50 according to the second embodiment performs various calculations and processes based on the control program stored in the ROM, and controls the operations of various devices to be controlled connected to the output ports thereof. The devices to be controlled according to the second embodiment include the compressor 21, the first expansion valve 24a, the second expansion valve 24b, the high-temperature side pump 33, the blower 42, and the like in addition to the heating medium pump 13 and the flow rate adjustment valve 14.

Figure 7:
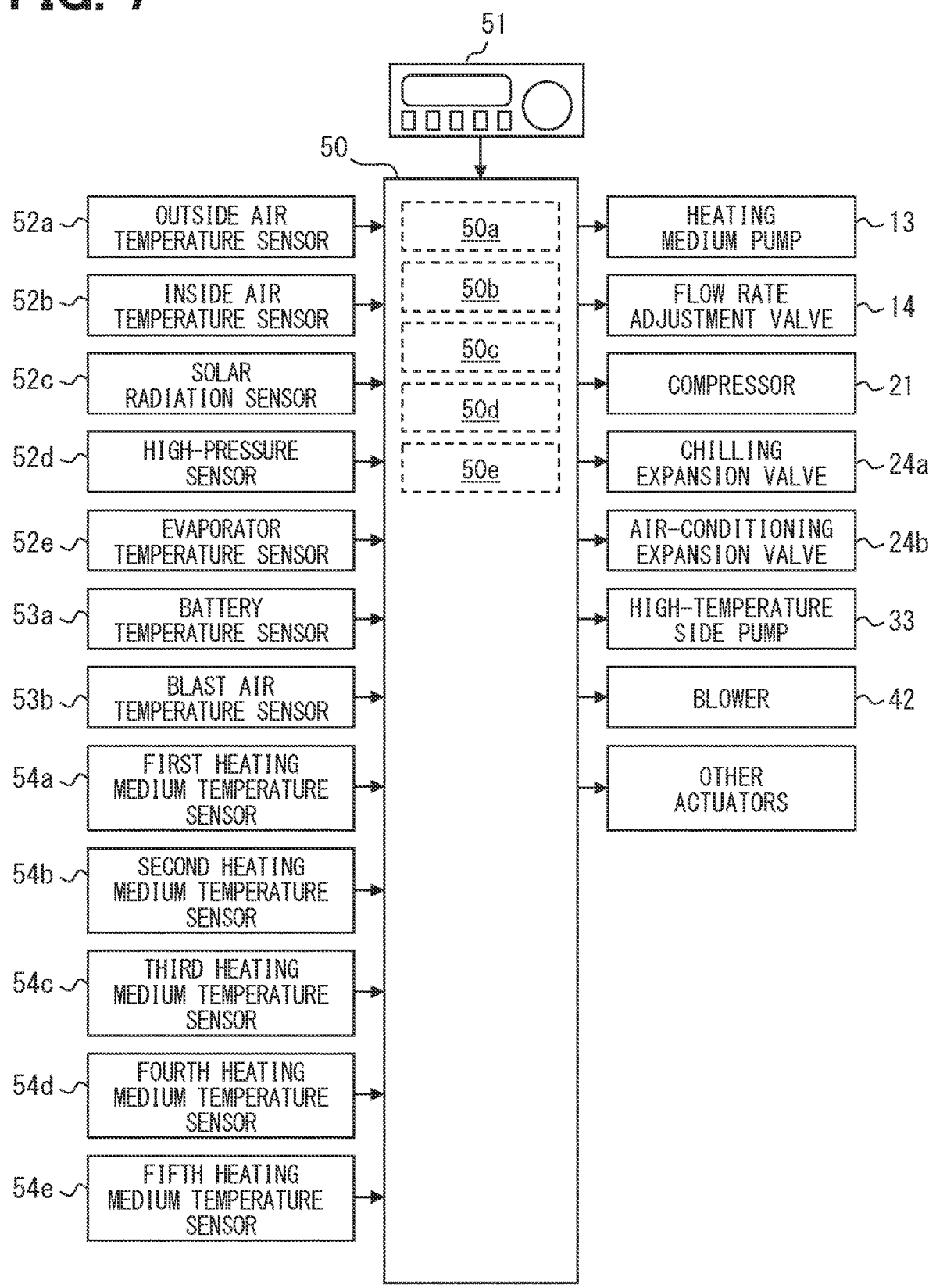
FIG. 7 is a block diagram illustrating a control system of the battery temperature control device according to the second embodiment.

As illustrated in FIG. 7, a control sensor group is connected to the input ports of the control device 50. As in the first embodiment, the control sensor group includes the outside air temperature sensor 52a, the battery temperature sensor 53a, and the first heating medium temperature sensor 54a. The outside air temperature sensor 52a and the battery temperature sensor 53a have the same configurations as those of the first embodiment. The first heating medium temperature sensor 54a in the second embodiment is disposed between the heating medium outlet of the heating medium passage 25b of the chiller 25 and the flow inlet port of the flow rate adjustment valve 14 in the common flow path 15c.

The control sensor group in the second embodiment further includes an inside air temperature sensor 52b, a solar radiation sensor 52c, a high pressure sensor 52d, an evaporator temperature sensor 52e, and a blast air temperature sensor 53b. The control sensor group includes a second heating medium temperature sensor 54b to a fifth heating medium temperature sensor 54e for detecting the temperatures of the heating medium of the heating medium circuit 10 and the high-temperature side heating medium of the high-temperature side heating medium circuit 31. As in the first embodiment, detection signals of the control sensor group are input to the control device 50.

The inside air temperature sensor 52b is an inside air temperature detection unit that detects a cabin interior temperature (inside air temperature) Tr. The solar radiation sensor 52c is a solar radiation amount detection unit that detects a solar radiation amount As with which the interior of the cabin is irradiated. The high pressure sensor 52d is a refrigerant pressure detection unit that detects a high pressure refrigerant pressure Pd in the refrigerant flow path from the discharge port of the compressor 21 to the inlet of the first expansion valve 24a or the second expansion valve 24b.

The evaporator temperature sensor 52e is an evaporator temperature detection unit that detects a refrigerant evaporating temperature (evaporator temperature) Tefin in the air-conditioning evaporator 26. The blast air temperature sensor 53b is a blast air temperature detection unit that detects a blast air temperature TAV blown into the cabin. The blast air temperature sensor 53b corresponds to an example of a blast air temperature acquisition unit.

The second heating medium temperature sensor 54b is disposed at the outlet portion of the heating medium passage 11a in the battery heat exchanger 11, and detects the temperature of the heating medium having passed through the battery heat exchanger 11. The third heating medium temperature sensor 54c is disposed at the heating medium outlet portion of the outside air heat exchanger 12, and detects the temperature of the heating medium flowing out of the outside air heat exchanger 12.

The fourth heating medium temperature sensor 54d is disposed at the outlet portion of the heating medium passage 22b of the heating medium refrigerant heat exchanger 22, and detects the temperature of the high-temperature side heating medium flowing out of the heating medium refrigerant heat exchanger 22. The fifth heating medium temperature sensor 54e is disposed at the heating medium outlet portion of the heater core 32, and detects the temperature of the high-temperature side heating medium flowing out of the heater core 32.

The battery temperature control device 1 refers to the detection results of the first heating medium temperature sensor 54a to the fifth heating medium temperature sensor 54e to switch the flow of the heating medium in the heating medium circuit 10 and the flow of the high-temperature side heating medium in the high-temperature side heating medium circuit 31. Thus, the battery temperature control device 1 can manage heat in the vehicle using the heating medium circuit 10 and the high-temperature side heating medium circuit 31.

Further, an operation panel 51 disposed in the vicinity of the instrument panel in the front portion of the interior of the cabin is connected to the input of the control device 50. A plurality of operation switches is disposed on the operation panel 51. Therefore, operation signals from the plurality of operation switches are input to the control device 50. Examples of the various operation switches on the operation panel 51 include an automatic switch, a cooling switch, an air volume setting switch, and a temperature setting switch.

The automatic switch is operated when the automatic control operation of the battery temperature control device 1 is set or canceled. The cooling switch is operated when requesting cooling of the interior of the cabin. The air volume setting switch is operated when manually setting the air volume of the blower 42. The temperature setting switch is operated when setting a target temperature Tset of the interior of the cabin.

In the control device 50, the control unit that controls various devices to be controlled connected to the output ports thereof is integrally configured, and a configuration (hardware and software) that controls the operation of each device to be controlled constitutes a control unit that controls the operation of each device to be controlled.

For example, in the control device 50, the configuration that controls the operation of the flow rate adjustment valve 14 in the heating medium circuit 10 to adjust the flow rate ratio between the heating medium flowing through the battery heat exchanger 11 and the heating medium flowing through the outside air heat exchanger 12 constitutes a flow rate ratio adjustment unit 50a. In the control device 50, the configuration that controls the pressure-feed amount of the flow rate adjustment valve 14 in the heating medium circuit 10 constitutes a pressure feeding capability control unit 50b.

In the control device 50, the configuration that controls the refrigerant discharge capacity of the compressor 21 in the refrigeration cycle 20 constitutes a compressor control unit 50c. In the control device 50, the configuration that controls the decompression amounts of the first expansion valve 24a and the second expansion valve 24b in the refrigeration cycle 20 constitutes a decompression control unit 50d. In the control device 50, the configuration that controls the pressure feeding capability of the high-temperature side pump 33 in the high-temperature side heating medium circuit 31 constitutes a high-temperature side control unit 50e.

According to the battery temperature control device 1 configured as described above, by controlling the operations of the heating medium pump 13 and the flow rate adjustment valve 14 of the heating medium circuit 10 in a state where the refrigeration cycle 20 is stopped, the same effects as those of the first embodiment can be exerted. That is, even in an environment where the outside air temperature is lower than the reference outside air temperature, the battery temperature control device 1 according to the second embodiment can suppress the temperature fluctuation of the heating medium flowing through the battery heat exchanger 11 and suppress the decrease in output and deterioration of the battery B due to the influence of the outside air OA with a low temperature.

Next, the operation of the battery temperature control device 1 according to the second embodiment will be described. As described above, the battery temperature control device 1 according to the second embodiment can appropriately switch between a plurality of operation modes. Switching between these operation modes is performed by executing a control program stored in advance in the control device 50.

As described above, the operation modes of the battery temperature control device 1 of the second embodiment include the cooling mode, the heating mode, the dehumidifying/heating mode, the single chilling mode, the chilling/cooling mode, the chilling/heating mode, and the chilling/dehumidifying/heating mode. Each operation mode will be described below.

(a) Cooling Mode

The cooling mode is an operation mode in which the blast air W is chilled by the air-conditioning evaporator 26 and blown into the cabin without chilling the battery B using the refrigeration cycle 20. In this cooling mode, the control device 50 fully closes the first expansion valve 24a and opens the second expansion valve 24b at a predetermined throttle opening degree.

Therefore, in the refrigeration cycle 20 in the cooling mode, a circulation circuit of the refrigerant flowing through the compressor 21, the heating medium refrigerant heat exchanger 22, the second expansion valve 24b, the air-conditioning evaporator 26, and the compressor 21 in this order is configured.

In this cycle configuration, the control device 50 performs control so that the operations of the various devices to be controlled connected to the output ports are in a mode suitable for the cooling mode according to the detection result of the control sensor group and the like. Specifically, the control device 50 controls the refrigerant discharge capacity of the compressor 21, the throttle opening degree of the second expansion valve 24b, the blowing capacity of the blower 42, the opening degree of the air mixing door 44, and the like.

In the heating medium circuit 10 in the cooling mode, since the low pressure refrigerant does not flow into the chiller 25, it is possible to operate the heating medium circuit 10 in the first embodiment. In the cooling mode, the circulation of the heating medium in the heating medium circuit 10 can be stopped.

Accordingly, the battery temperature control device 1 in the cooling mode can cool the interior of the cabin by blowing the blast air W chilled by the air-conditioning evaporator 26 into the cabin. The battery temperature control device 1 can adjust the temperature of the battery B by exchanging heat between the heating medium of the heating medium circuit 10 and the outside air OA in the outside air heat exchanger 12.

(b) Heating Mode

The heating mode is an operation mode in which the blast air W is heated by the heater core 32 and blown into the cabin without chilling the battery B using the refrigeration cycle 20. In the heating mode, the control device 50 opens the first expansion valve 24a at a predetermined throttle opening degree and fully closes the second expansion valve 24b. Therefore, in the refrigeration cycle 20 in the heating mode, a refrigerant circulation circuit in which the refrigerant circulates through the compressor 21, the heating medium refrigerant heat exchanger 22, the first expansion valve 24a, the chiller 25, and the compressor 21 in this order is configured.

In this cycle configuration, the control device 50 performs control so that the operations of the various devices to be controlled connected to the output ports are in a mode suitable for the heating mode according to the detection result of the control sensor group or the like. Specifically, the control device 50 controls the refrigerant discharge capacity of the compressor 21, the throttle opening degree of the first expansion valve 24a, the blowing capacity of the blower 42, the pressure feeding capability of the high-temperature side pump 33, the opening degree of the air mixing door 44, and the like.

In the heating medium circuit 10 in the heating mode, the control device 50 controls the heating medium pump 13 and the flow rate adjustment valve 14 so that the heating medium circulates through the heating medium pump 13, the chiller 25, the flow rate adjustment valve 14, the outside air heat exchanger 12, and the heating medium pump 13 in this order.

That is, the battery temperature control device 1 in the heating mode can perform heating by pumping up heat absorbed from the outside air OA in the outside air heat exchanger 12 of the heating medium circuit 10 by the refrigeration cycle 20, and using the heat for heating the blast air W via the high-temperature side heating medium circuit 31.

(c) Dehumidifying/Heating Mode

The dehumidifying/heating mode is an operation mode in which the blast air W chilled by the air-conditioning evaporator 26 is heated by the heater core 32 and blown into the cabin without chilling the battery B using the refrigeration cycle 20. In the dehumidifying/heating mode, the control device 50 opens each of the second expansion valve 24b and the first expansion valve 24a at a predetermined throttle opening degree.

Therefore, in the refrigeration cycle 20 in the dehumidifying/heating mode, the refrigerant circulates through the compressor 21, the heating medium refrigerant heat exchanger 22, the second expansion valve 24b, the air-conditioning evaporator 26, and the compressor 21 in this order. At the same time, the refrigerant circulates through the compressor 21, the heating medium refrigerant heat exchanger 22, the first expansion valve 24a, the chiller 25, and the compressor 21 in this order. That is, in the refrigeration cycle 20 in the dehumidifying/heating mode, a refrigerant circulation circuit in which the chiller 25 and the air-conditioning evaporator 26 are connected in parallel for the flow of the refrigerant flowing out of the heating medium refrigerant heat exchanger 22 is configured.

In this cycle configuration, the control device 50 performs control so that the operations of the various devices to be controlled connected to the output ports are in a mode suitable for the dehumidifying/heating mode according to the detection result of the control sensor group and the like. Specifically, the control device 50 controls the refrigerant discharge capacity of the compressor 21, the throttle opening degrees of the first expansion valve 24a and the second expansion valve 24b, the blowing capacity of the blower 42, the pressure feeding capability of the high-temperature side pump 33, the opening degree of the air mixing door 44, and the like.

In the heating medium circuit 10 in the dehumidifying/heating mode, the control device 50 controls the heating medium pump 13 and the flow rate adjustment valve 14 so that the heating medium circulates through the heating medium pump 13, the chiller 25, the flow rate adjustment valve 14, the outside air heat exchanger 12, and the heating medium pump 13 in this order.

Accordingly, the battery temperature control device 1 in the dehumidifying/heating mode can realize dehumidifying and heating in which heat absorbed from the outside air OA in the heating medium circuit 10 is pumped up by the refrigeration cycle 20 and the chilled blast air W is heated through the high-temperature side heating medium circuit 31.

(d) Single Chilling Mode

The single chilling mode is an operation mode in which the battery B is chilled using the refrigeration cycle 20 without performing the air-conditioning operation for the interior of the cabin. In the single chilling mode, the control device 50 opens the first expansion valve 24a at a predetermined throttle opening degree and fully closes the second expansion valve 24b. Therefore, in the refrigeration cycle 20 in the single chilling mode, a refrigerant circulation circuit in which the refrigerant circulates through the compressor 21, the heating medium refrigerant heat exchanger 22, the first expansion valve 24a, the chiller 25, and the compressor 21 in this order is configured.

In this cycle configuration, the control device 50 performs control so that the operations of the various devices to be controlled connected to the output ports are in a mode suitable for the single chilling mode according to the detection result of the control sensor group and the like. Specifically, the control device 50 controls the refrigerant discharge capacity of the compressor 21, the throttle opening degree of the first expansion valve 24a, the opening degree of the air mixing door 44, and the like.

In the heating medium circuit 10 in the single chilling mode, the control device 50 controls the heating medium pump 13 and the flow rate adjustment valve 14 so that the heating medium circulates through the heating medium pump 13, the chiller 25, the flow rate adjustment valve 14, the battery heat exchanger 11, and the heating medium pump 13 in this order.

Thus, the battery temperature control device 1 in the single chilling mode can cause the heating medium chilled by the heat exchange with the low pressure refrigerant in the chiller 25 to flow through the heating medium passage 11a of the battery heat exchanger 11, so that the battery B can be chilled using the refrigeration cycle 20.

(e) Chilling/Cooling Mode

The chilling/cooling mode is an operation mode in which the blast air W is chilled by the air-conditioning evaporator 26 and blown into the cabin in parallel with the chilling of the battery B using the refrigeration cycle. In the chilling/cooling mode, the control device 50 opens each of the first expansion valve 24a and the second expansion valve 24b at a predetermined throttle opening degree.

Therefore, in the refrigeration cycle 20 in the chilling/cooling mode, the refrigerant circulates through the compressor 21, the heating medium refrigerant heat exchanger 22, the first expansion valve 24a, the chiller 25, and the compressor 21 in this order. At the same time, the refrigerant circulates through the compressor 21, the heating medium refrigerant heat exchanger 22, the second expansion valve 24b, the air-conditioning evaporator 26, and the compressor 21 in this order. That is, in the refrigeration cycle 20 in the chilling/cooling mode, a refrigerant circulation circuit in which the air-conditioning evaporator 26 and the chiller 25 are connected in parallel for the flow of the refrigerant flowing out of the heating medium refrigerant heat exchanger 22 is configured.

In this cycle configuration, the control device 50 performs control so that the operations of the various devices to be controlled connected to the output ports are in a mode suitable for the chilling/cooling mode according to the detection result of the control sensor group and the like. Specifically, the control device 50 controls the refrigerant discharge capacity of the compressor 21, the throttle opening degrees of the first expansion valve 24a and the second expansion valve 24b, the blowing capacity of the blower 42, the opening degree of the air mixing door 44, and the like.

In the heating medium circuit 10 in the chilling/cooling mode, the control device 50 controls the heating medium pump 13 and the flow rate adjustment valve 14 so that the heating medium circulates through the heating medium pump 13, the chiller 25, the flow rate adjustment valve 14, the battery heat exchanger 11, and the heating medium pump 13 in this order.

As a result, the battery temperature control device 1 in the chilling/cooling mode can cause the heating medium chilled by heat exchange with the low pressure refrigerant in the chiller 25 to flow through the battery heat exchanger 11, so that the battery B can be chilled.

In the chilling/cooling mode, the low pressure refrigerant is evaporated by heat exchange with the blast air W in the air-conditioning evaporator 26 to chill the blast air W, thereby chilling the interior of the cabin. Therefore, the battery temperature control device 1 in the chilling/cooling mode can improve comfort by chilling the interior of the cabin together with chilling the battery B using the refrigeration cycle 20.

(f) Chilling/Heating Mode

The chilling/heating mode is an operation mode in which the blast air W is heated by the heater core 32 and blown into the cabin in parallel with the chilling of the battery B using the refrigeration cycle 20. In the chilling/heating mode, the control device 50 opens the first expansion valve 24a at a predetermined throttle opening degree and fully closes the second expansion valve 24b. Therefore, in the refrigeration cycle 20 in the chilling/heating mode, a refrigerant circulation circuit in which the refrigerant circulates through the compressor 21, the heating medium refrigerant heat exchanger 22, the first expansion valve 24a, the chiller 25, and the compressor 21 in this order is configured.

In this cycle configuration, the control device 50 performs control so that the operations of the various devices to be controlled connected to the output ports are in a mode suitable for the chilling/heating mode according to the detection result of the control sensor group or the like. Specifically, the control device 50 controls the refrigerant discharge capacity of the compressor 21, the throttle opening degree of the first expansion valve 24a, the blowing capacity of the blower 42, the pressure feeding capability of the high-temperature side pump 33, the opening degree of the air mixing door 44, and the like.

In the heating medium circuit 10 in the chilling/heating mode, the control device 50 controls the heating medium pump 13 and the flow rate adjustment valve 14 so that the heating medium circulates through the heating medium pump 13, the chiller 25, the flow rate adjustment valve 14, the battery heat exchanger 11, and the heating medium pump 13 in this order.

Thus, the battery temperature control device 1 in the chilling/heating mode can cause the heating medium chilled by heat exchange with the low pressure refrigerant in the chiller 25 to flow through the battery heat exchanger 11, thereby chilling the battery B.

In the chilling/heating mode, the waste heat of the battery B is pumped up by the refrigeration cycle 20 and radiated to the blast air W by the heater core 32, so that the interior of the cabin can be heated. Therefore, the battery temperature control device 1 in the chilling/heating mode can improve comfort by chilling the battery B using the refrigeration cycle 20 and heating the interior of the cabin using waste heat of the battery B as a heat source.

(g) Chilling/Dehumidifying/Heating Mode

The chilling/dehumidifying/heating mode is an operation mode in which the blast air W chilled by the air-conditioning evaporator 26 is heated by the heater core 32 and blown into the cabin in parallel with the chilling of the battery B using the refrigeration cycle 20. In the chilling/dehumidifying/heating mode, the control device 50 opens the first expansion valve 24a and the second expansion valve 24b at predetermined throttle opening degrees.

Therefore, in the refrigeration cycle 20 in the chilling/dehumidifying/heating mode, the refrigerant circulates through the compressor 21, the heating medium refrigerant heat exchanger 22, the first expansion valve 24a, the chiller 25, and the compressor 21 in this order. At the same time, the refrigerant circulates through the compressor 21, the heating medium refrigerant heat exchanger 22, the second expansion valve 24b, the air-conditioning evaporator 26, and the compressor 21 in this order.

That is, in the refrigeration cycle 20 in the chilling/dehumidifying/heating mode, a refrigerant circulation circuit in which the chiller 25 and the air-conditioning evaporator 26 are connected in parallel for the flow of the refrigerant flowing out of the heating medium refrigerant heat exchanger 22 is configured.

In this cycle configuration, the control device 50 performs control so that the operations of the various devices to be controlled connected to the output ports are in a mode suitable for the chilling/dehumidifying/heating mode according to the detection result of the control sensor group or the like. Specifically, the control device 50 controls the refrigerant discharge capacity of the compressor 21, the throttle opening degrees of the first expansion valve 24a and the second expansion valve 24b, the blowing capacity of the blower 42, the pressure feeding capability of the high-temperature side pump 33, the opening degree of the air mixing door 44, and the like.

In the heating medium circuit 10 in the chilling/dehumidifying/heating mode, the control device 50 controls the heating medium pump 13 and the flow rate adjustment valve 14 so that the heating medium circulates through the heating medium pump 13, the chiller 25, the flow rate adjustment valve 14, the battery heat exchanger 11, and the heating medium pump 13 in this order.

Thus, the battery temperature control device 1 in the chilling/dehumidifying/heating mode can cause the heating medium chilled by the heat exchange with the low pressure refrigerant in the chiller 25 to flow through the battery heat exchanger 11, so that the battery B can be chilled.

In the chilling/dehumidifying/heating mode, the waste heat of the battery B is pumped up by the refrigeration cycle 20, and radiated to the blast air W chilled by the air-conditioning evaporator 26, so that the interior of the cabin can be dehumidified and heated. Therefore, the battery temperature control device 1 in the chilling/dehumidifying/heating mode can improve comfort by chilling the battery B using the refrigeration cycle 20 and dehumidifying/heating the interior of the cabin using waste heat of the battery B as a heat source.

Here, the battery temperature control device 1 according to the second embodiment executes various control programs when temperature adjustment of the battery B and air conditioning of the interior of the cabin using the refrigeration cycle 20 are performed in an environment where the outside air OA has a low temperature.

Figure 8:
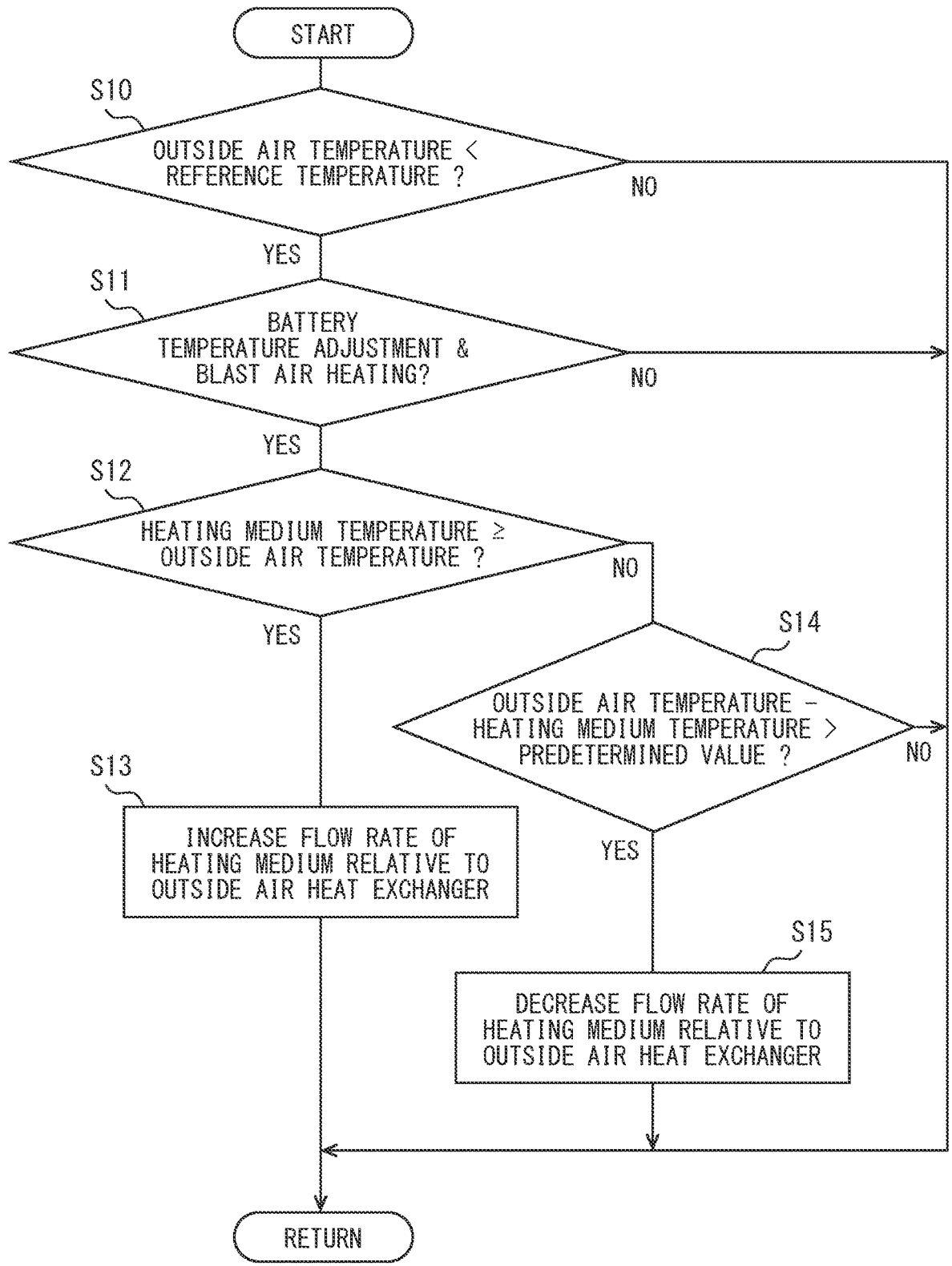
FIG. 8 is a flowchart related to control of the flow rate adjustment valve when the outside air temperature is low.

When the interior of the cabin is air conditioned and the battery B is chilled using the refrigeration cycle 20 in an environment where the outside air OA has a low temperature, for example, the control program illustrated in FIG. 8 is executed. First, in step S10, as in step S1 described above, it is determined whether the outside air temperature is lower than the reference outside air temperature.

When it is determined that the outside air temperature is lower than the reference outside air temperature, the process proceeds to step S11. On the other hand, when it is determined that the outside air temperature is equal to or higher than the reference outside air temperature, the control program illustrated in FIG. 8 is once terminated and executed again.

In step S11, it is determined whether the operation mode of the battery temperature control device 1 is the operation mode in which the blast air is heated at the same time as the temperature of the battery B is adjusted. That is, in step S11, it is determined whether the chilling/heating mode or the chilling/dehumidifying/heating mode is selected as the operation mode. When it is determined that the operation mode is the operation mode in which the temperature of the battery B is adjusted and the blast air is heated, the process proceeds to step S12. When it is determined that the operation mode is not the case, the control program illustrated in FIG. 8 is once terminated and executed again.

In step S12, it is determined whether the heating medium temperature detected by the first heating medium temperature sensor 54a is equal to or higher than the outside air temperature. When it is determined that the heating medium temperature is equal to or higher than the outside air temperature, the process proceeds to step S13. When it is determined that the temperature is not the case, the process proceeds to step S14.

In step S13, the operation of the flow rate adjustment valve 14 is controlled so as to increase the flow rate of the heating medium in the first flow path 15a to the outside air heat exchanger 12 and to decrease the flow rate of the heating medium in the second flow path 15b to the battery heat exchanger 11. At this time, the opening degree of the flow outlet port of the flow rate adjustment valve 14 on the outside air heat exchanger 12 side is set to be larger as the temperature difference between the heating medium temperature and the outside air temperature is larger. Thereafter, the control program illustrated in FIG. 8 is terminated and executed again.

Here, the case of proceeding to step S13 is a case where the heating medium temperature is equal to or higher than the outside air temperature, and is a case where the outside air has a low temperature. Therefore, in step S13, by controlling the operation of the flow rate adjustment valve 14 so that the flow rate through the outside air heat exchanger 12 increases, the heating medium temperature detected by the first heating medium temperature sensor 54a can be lowered.

In step S14, it is determined whether the temperature difference between the heating medium temperature detected by the first heating medium temperature sensor 54a and the outside air temperature is larger than a predetermined value (for example, 5° C.). When the process proceeds to step S14, since the heating medium temperature is lower than the outside air temperature, it is determined in step S14 whether the heating medium flowing through the common flow path 15c is excessively chilled with respect to the outside air.

In the battery temperature control device 1, when the heating medium flowing through the common flow path 15c is excessively chilled with respect to the outside air, it is considered that the waste heat of the battery B is radiated to the outside air rather than to the heating medium. Therefore, when the heating medium is excessively chilled with respect to the outside air, the waste heat of the battery B cannot be sufficiently absorbed by the heating medium, and thus it is considered that the waste heat of the battery B cannot be utilized as a heat source for heating the blast air. That is, in step S14, it is determined whether the waste heat of the battery B can be utilized from the relationship between the heating medium temperature and the outside air temperature.

When it is determined that the temperature difference between the heating medium temperature and the outside air temperature is larger than the predetermined value, the process proceeds to step S15. On the other hand, when it is determined the temperature difference is not the case, the outside air OA and the waste heat of the battery B can be efficiently used as the heat sources for heating the blast air via the heating medium circuit 10, and thus, the control program illustrated in FIG. 8 is once terminated and executed again.

In step S15, the operation of the flow rate adjustment valve 14 is controlled so as to decrease the flow rate of the heating medium in the first flow path 15a to the outside air heat exchanger 12 and increase the flow rate of the heating medium in the second flow path 15b to the battery heat exchanger 11. At this time, the opening degree of the flow outlet port of the flow rate adjustment valve 14 on the outside air heat exchanger 12 side is set smaller as the temperature difference between the heating medium temperature and the outside air temperature is larger. Thereafter, the control program illustrated in FIG. 8 is terminated and executed again.

By controlling the operation of the flow rate adjustment valve 14 in step S15, the flow rate of the heating medium chilled by the heat exchange with the outside air in the outside air heat exchanger 12 of the heating medium circulating in the heating medium circuit 10 is reduced. Therefore, it is possible to suppress a decrease in the temperature of the heating medium flowing through the common flow path 15c and bring the state close to a state where the waste heat of the battery B can be efficiently used as a heat source for heating the blast air.

According to the battery temperature control device 1 of the second embodiment, by controlling the operation of the flow rate adjustment valve 14 in the chilling/heating mode or the chilling/dehumidifying/heating mode, it is possible to efficiently use the outside air OA and the waste heat of the battery B as the heat sources for heating the blast air.

Figure 9:
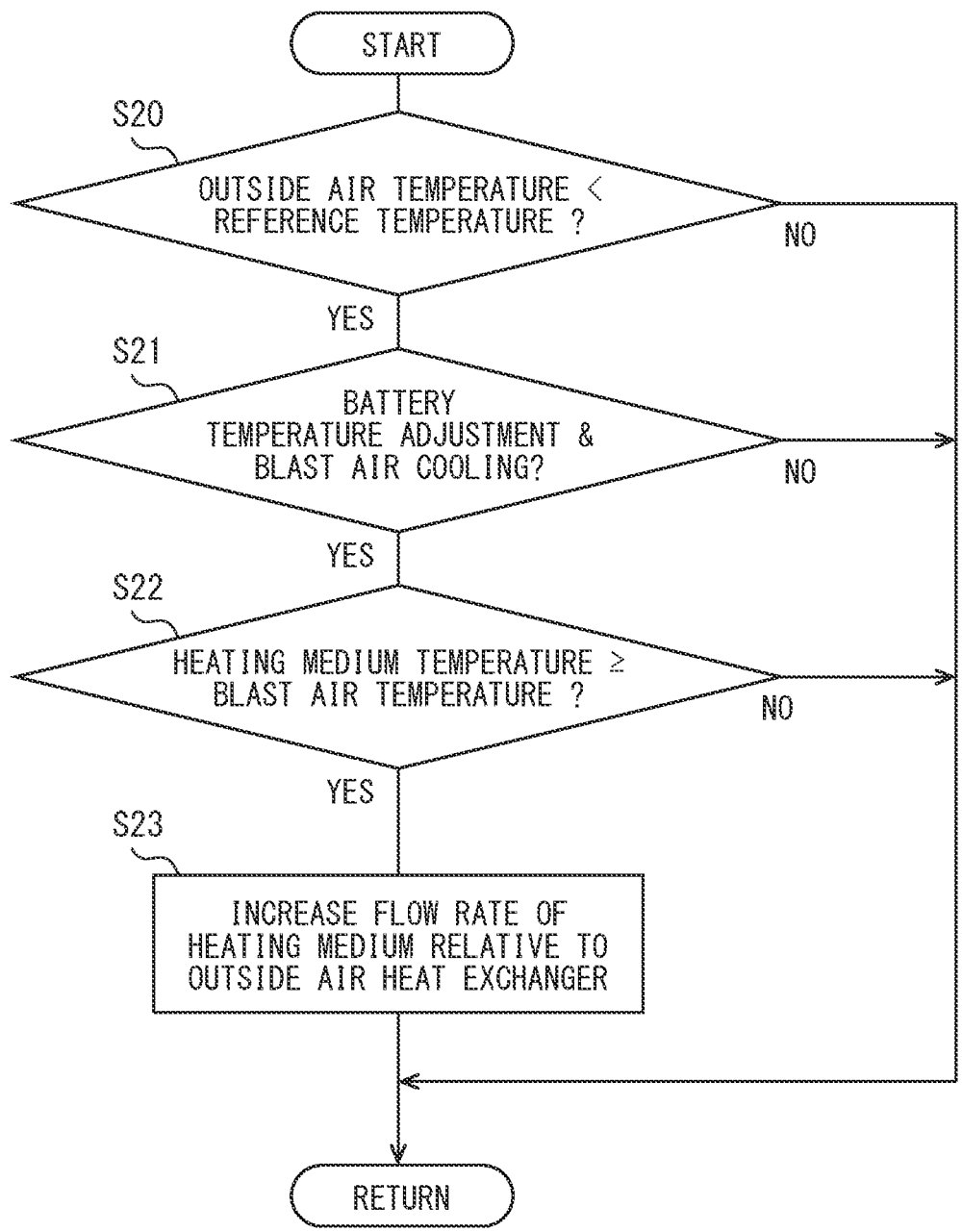
FIG. 9 is a flowchart related to control of a flow rate adjustment valve in a case of chilling blast air.

When the interior of the cabin is air conditioned and the battery B is chilled using the refrigeration cycle 20 in an environment where the outside air OA has a low temperature, the control program illustrated in FIG. 9 is executed. First, as in step S1 and the like described above, in step S20, it is determined whether the outside air temperature is lower than the reference outside air temperature.

When it is determined that the outside air temperature is lower than the reference outside air temperature, the process proceeds to step S21. On the other hand, when it is determined that the outside air temperature is equal to or higher than the reference outside air temperature, the control program illustrated in FIG. 9 is once terminated and executed again.

In step S21, it is determined whether the operation mode of the battery temperature control device 1 is the operation mode in which the blast air is chilled at the same time as the temperature of the battery B is adjusted. That is, in step S21, it is determined whether the chilling/cooling mode or the chilling/dehumidifying/heating mode is selected as the operation mode. When it is determined that the operation mode is the operation mode in which the temperature of the battery B is adjusted and the blast air is chilled, the process proceeds to step S22. When it is determined that the operation mode is not the case, the control program illustrated in FIG. 9 is once terminated and executed again.

In step S22, it is determined whether the heating medium temperature detected by the first heating medium temperature sensor 54a is equal to or higher than the blast air temperature detected by the blast air temperature sensor 53b. When the heating medium temperature is equal to or higher than the blast air temperature, it is expected that the refrigerant pressure in the air-conditioning evaporator 26 in the refrigeration cycle 20 increases and the chilling capacity and the dehumidifying capacity of the air-conditioning evaporator 26 decrease. When it is determined that the heating medium temperature is equal to or higher than the blast air temperature, the process proceeds to step S23. When it is determined the heating medium temperature is not the case, the control program illustrated in FIG. 9 is terminated and executed again.

In step S23, the operation of the flow rate adjustment valve 14 is controlled so as to increase the flow rate of the heating medium in the first flow path 15a to the outside air heat exchanger 12 and to decrease the flow rate of the heating medium in the second flow path 15b to the battery heat exchanger 11. At this time, the opening degree of the flow outlet port of the flow rate adjustment valve 14 on the outside air heat exchanger 12 side is set to be larger as the temperature difference between the heating medium temperature and the blast air temperature is larger. Thereafter, the control program illustrated in FIG. 9 is terminated and executed again.

When the operation of the flow rate adjustment valve 14 is controlled in step S23, the flow rate ratio of the heating medium passing through the outside air heat exchanger 12 of the heating medium circulating in the heating medium circuit 10 increases, so that the temperature of the heating medium flowing through the common flow path 15c can be lowered. As a result, it is possible to suppress an increase in the refrigerant pressure inside the air-conditioning evaporator 26 in the refrigeration cycle 20 and suppress a decrease in the chilling capacity and the dehumidifying capacity of the air-conditioning evaporator 26.

As described above, since the battery temperature control device 1 according to the second embodiment includes the refrigeration cycle 20, the heating unit 30, and the like in addition to the heating medium circuit 10, it is possible to perform the air conditioning of the interior of the cabin which is the space to be air-conditioned in addition to the temperature adjustment of the battery B by the heat exchange with the outside air OA.

According to the battery temperature control device 1 of the second embodiment, the waste heat of the battery B and the outside air subjected to the heat exchange in the heating medium circuit 10 can be effectively used for the air conditioning of the interior of the cabin using the refrigeration cycle 20.

As illustrated in FIG. 8, the battery temperature control device 1 according to the second embodiment controls the operation of the flow rate adjustment valve 14 so that the heating medium temperature of the heating medium flowing through the common flow path 15c is equal to or lower than the outside air temperature when the blast air is heated in a low temperature environment where the outside air has a low temperature.

As a result, the battery temperature control device 1 according to the second embodiment can cause the heating medium of the heating medium circuit 10 to absorb the heat of the outside air OA and the waste heat of the battery B, and can utilize the heat of the outside air OA and the waste heat of the battery B as heat sources for heating the blast air.

The battery temperature control device 1 according to the second embodiment controls the operation of the flow rate adjustment valve 14 so that the temperature difference between the outside air temperature and the heating medium temperature is smaller than a predetermined value as illustrated in FIG. 8 when the blast air is heated in a low temperature environment where the outside air has a low temperature.

As a result, the battery temperature control device 1 according to the second embodiment can create a situation in which radiation of the waste heat generated in the battery B to the outside air is suppressed and the waste heat is absorbed by the heating medium by controlling the operation of the flow rate adjustment valve 14. Therefore, the battery temperature control device 1 according to the second embodiment can more reliably use the outside air OA and the waste heat of the battery B as the heat sources for heating the blast air.

Further, as shown in FIG. 9, the battery temperature control device 1 according to the second embodiment controls the operation of the flow rate adjustment valve 14 so that the heating medium temperature of the heating medium flowing through the common flow path 15c is lower than the blast air temperature when the blast air is chilled in a low temperature environment where the outside air has a low temperature.

Thus, according to the battery temperature control device 1 of the second embodiment, the increase in the refrigerant pressure inside the air-conditioning evaporator 26 in the refrigeration cycle 20 can be suppressed, so that it is possible to suppress the deterioration in the chilling capacity and the dehumidifying capacity of the air-conditioning evaporator 26. As a result, the battery temperature control device 1 can maintain the comfort of the interior of the cabin, which is the space to be air-conditioned, in a favorable state when the blast air is chilled in a low temperature environment where the outside air has a low temperature.

Third Embodiment

Next, the third embodiment different from the above-described first embodiment will be described with reference to FIG. 10. The third embodiment is different from the second embodiment in the configuration of the refrigeration cycle 20. Since the basic configuration and the like of the battery temperature control device 1 are similar to those of the second embodiment, the description thereof will not be repeated.

Figure 10:
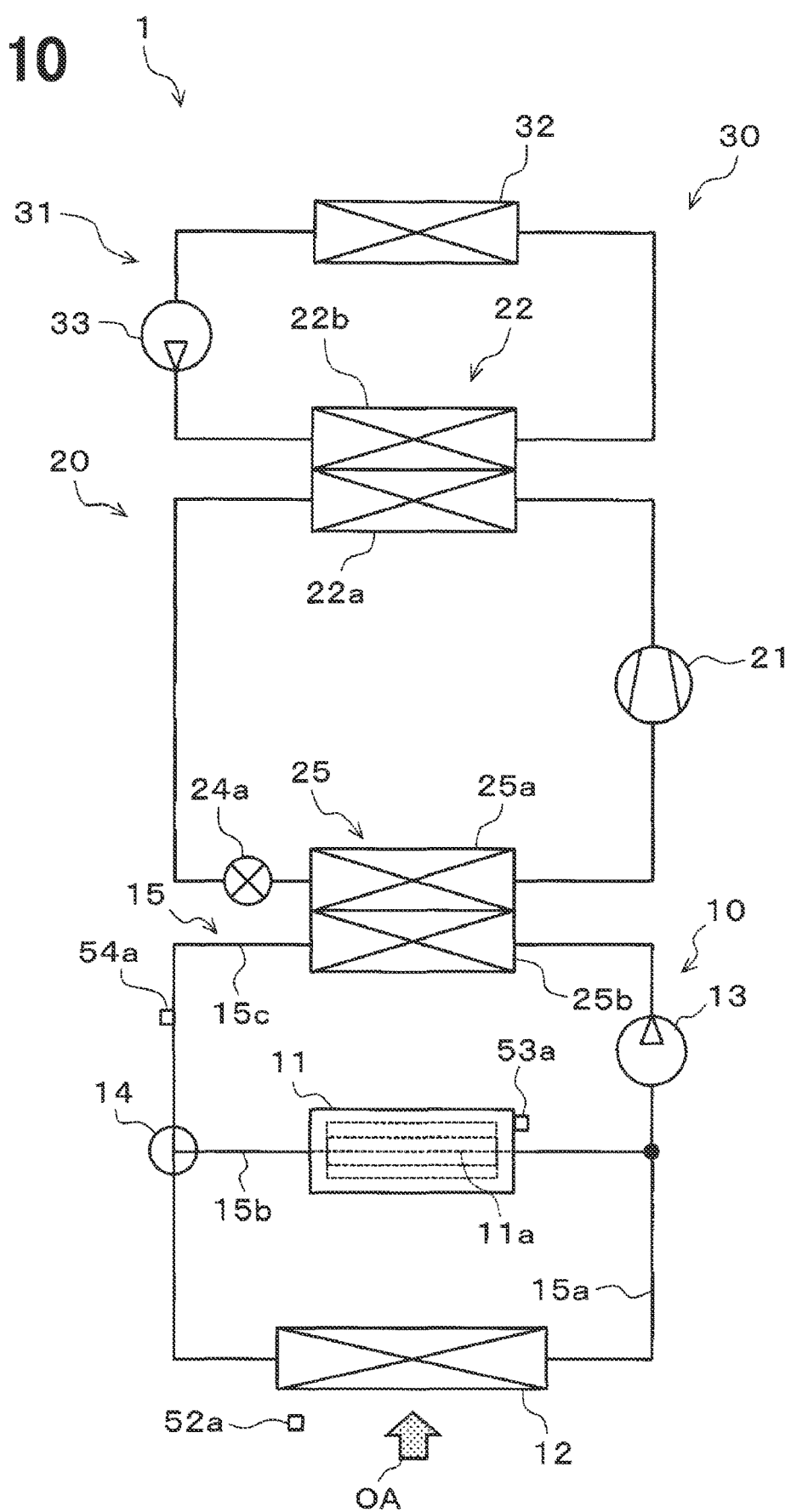
FIG. 10 is an overall configuration diagram of a battery temperature control device according to the third embodiment.

As illustrated in FIG. 10, the refrigeration cycle 20 in the battery temperature control device 1 according to the third embodiment does not include the second expansion valve 24b and the air-conditioning evaporator 26 according to the second embodiment. In other words, the refrigeration cycle 20 of the third embodiment is a refrigerant circulation circuit configured by connecting the compressor 21, the heating medium refrigerant heat exchanger 22, the first expansion valve 24a, and the chiller 25.

Therefore, the battery temperature control device 1 according to the third embodiment can perform temperature adjustment of the battery B using the refrigeration cycle 20, temperature adjustment of the battery B by heat exchange with the outside air OA, and heating of the cabin interior using the outside air OA or the waste heat of the battery B as a heat source.

As described above, according to the battery temperature control device 1 of the third embodiment, even when the low-pressure side configuration of the refrigeration cycle 20 of the second embodiment is changed, it is possible to similarly obtain the operational effects obtained from the configuration and operation common to the second embodiment described above.

The present disclosure is not limited to the above-described embodiments, and can be variously modified as follows without departing from the gist of the present disclosure.

Figure 11:
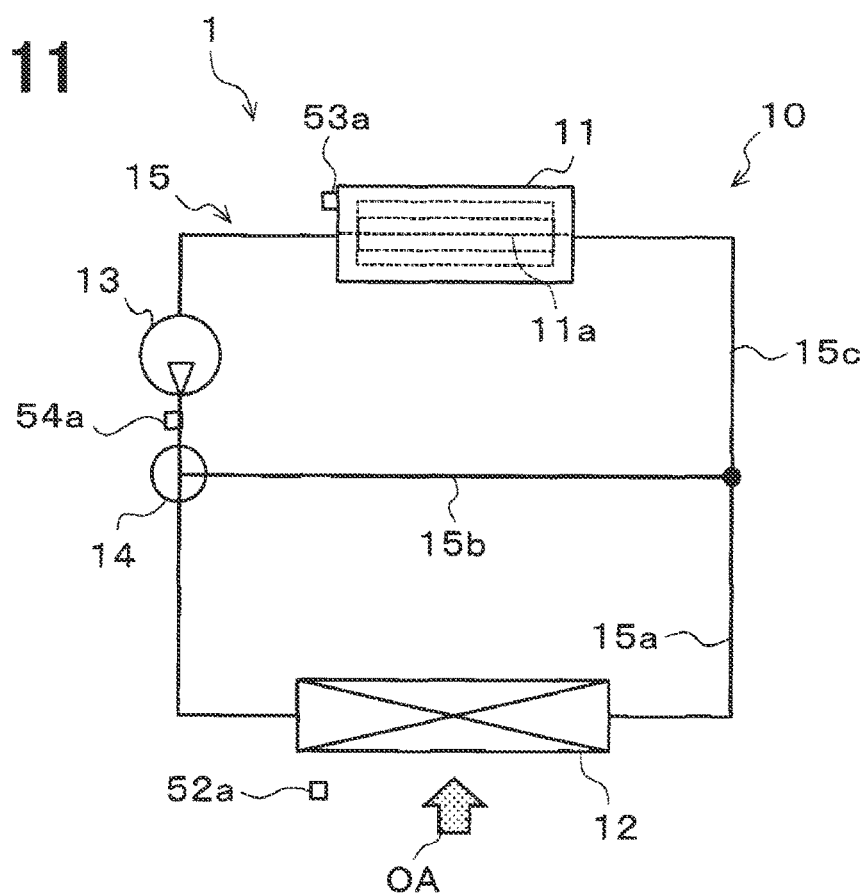
FIG. 11 is an explanatory view showing a modification related to the arrangement of a battery heat exchanger and a heating medium pump in a heating medium circuit.

The arrangement of the battery heat exchanger 11 in the heating medium circuit 10 is not limited to the positional relationship shown in the above-described embodiment. For example, in the above-described embodiment, the battery heat exchanger 11 is disposed in the second flow path 15b, but the present invention is not limited to this disposition. For example, as shown in FIG. 11, battery heat exchanger 11 may be disposed in the common flow path 15c.

The arrangement of the heating medium pump 13 in the heating medium circuit 10 is also not limited to the above-described embodiment. In the embodiment described above, in the common flow path 15c of the merging portion of the first flow path 15a and the second flow path 15b, the suction port of the heating medium pump 13 is connected to the merging portion, but the arrangement is not limited thereto. For example, as shown in FIG. 11, for the flow rate adjustment valve 14 in the common flow path 15c, the discharge port of the heating medium pump 13 may be connected to the flow inlet port of the flow rate adjustment valve 14.

In the embodiment described above, the flow rate adjustment valve 14 is used as the flow rate regulating unit, but various modes can be used as long as the flow rate of the heating medium in each of the first flow path 15a and the second flow path 15b can be adjusted.

Figure 12:
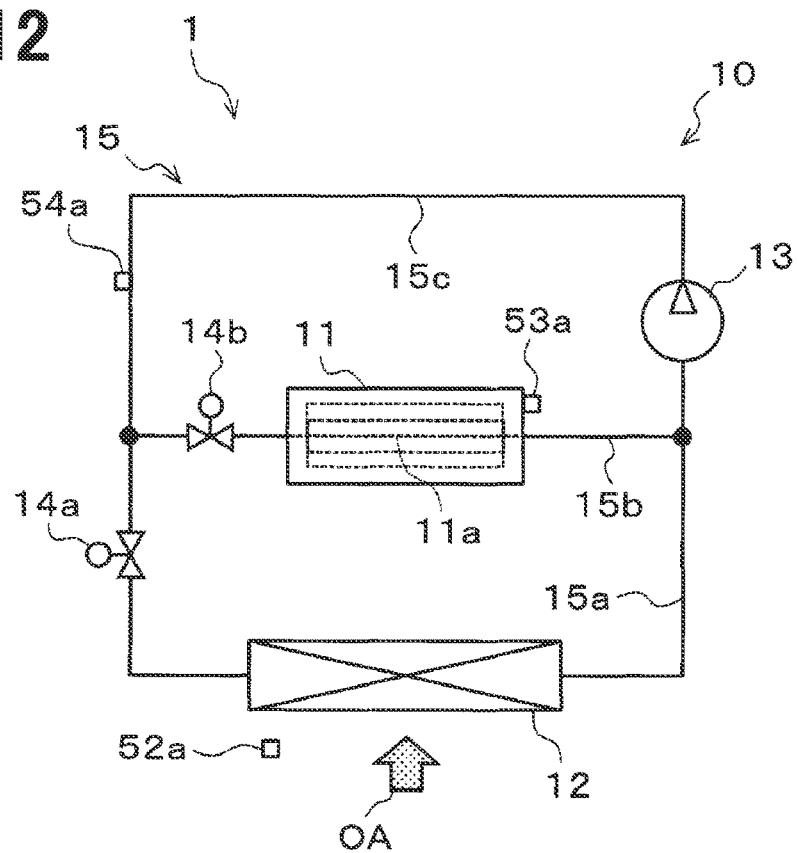
FIG. 12 is an explanatory view showing a modification of a flow rate regulating unit in the heating medium circuit.

For example, as illustrated in FIG. 12, the flow rate regulating unit may include a first on-off valve 14a disposed in the first flow path 15a and a second on-off valve 14b disposed in the second flow path 15b. The first on-off valve 14a and the second on-off valve 14b are on-off valves capable of adjusting the opening degree of the heating medium flow path such as the first flow path 15a. Further, an on-off valve similar to the first on-off valve may be disposed in one of the first flow path 15a and the second flow path 15b to form a flow rate regulating unit.

Figure 13:
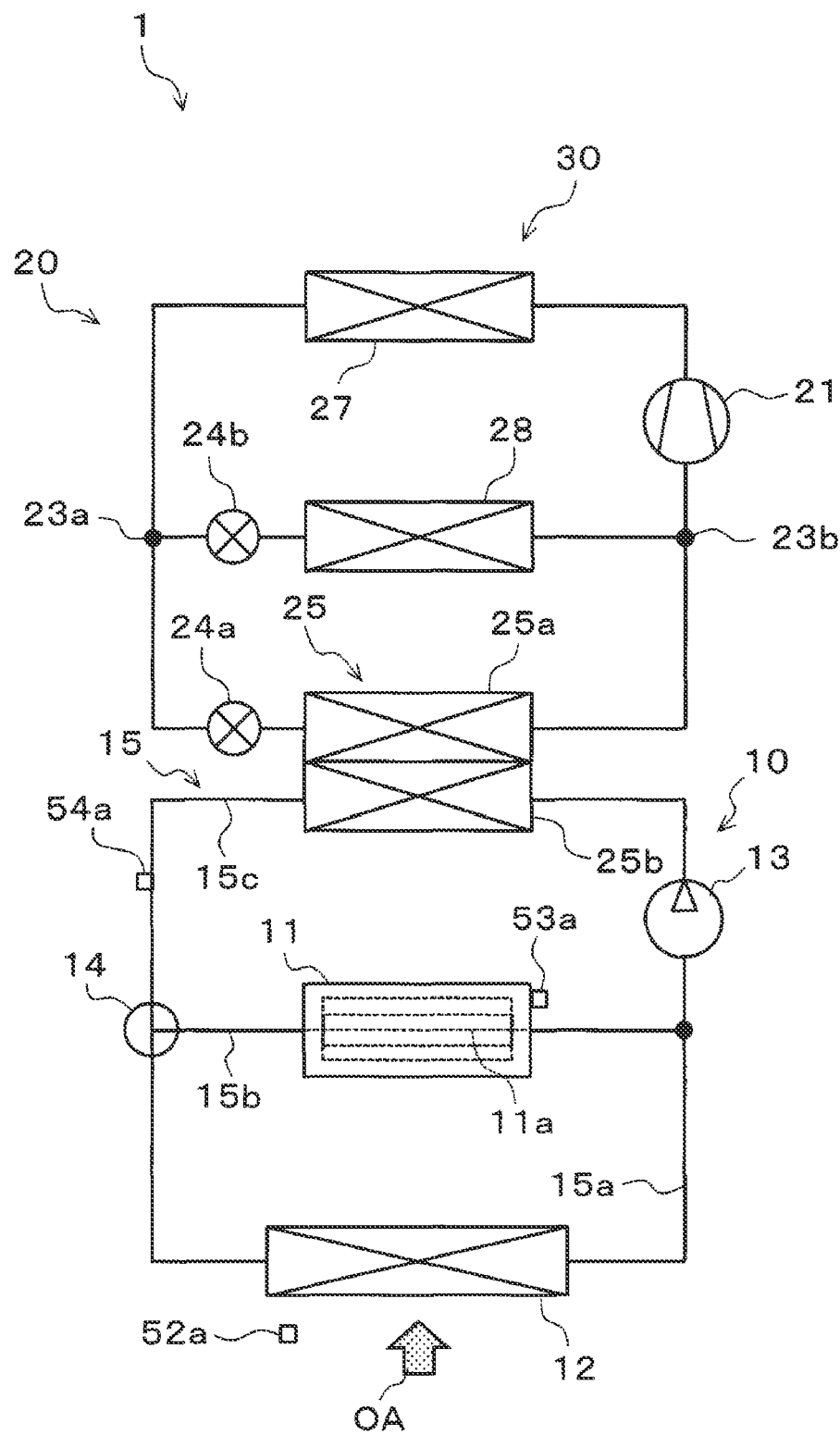
FIG. 13 is an explanatory diagram illustrating a first modification of the refrigeration cycle in the battery temperature control device.

In the second embodiment described above, the heating unit 30 for heating the blast air includes the heating medium refrigerant heat exchanger 22 and the high-temperature side heating medium circuit 31, but the present invention is not limited to this aspect. For example, as illustrated in FIG. 13, the high-temperature side heating medium circuit 31 may be eliminated, and an interior condenser 27 may be disposed instead of the heating medium refrigerant heat exchanger 22. The interior condenser 27 is disposed at the position of the heater core 32 in the cabin air-conditioning unit 40.

In the second embodiment, the air-conditioning evaporator 26 is disposed as one of the evaporators in the refrigeration cycle 20, but an evaporator used for other purposes may be disposed. For example, as illustrated in FIG. 13, an outdoor heat exchanger 28 that exchanges heat between a low pressure refrigerant and outside air may be disposed instead of the air-conditioning evaporator 26.

Figure 14:
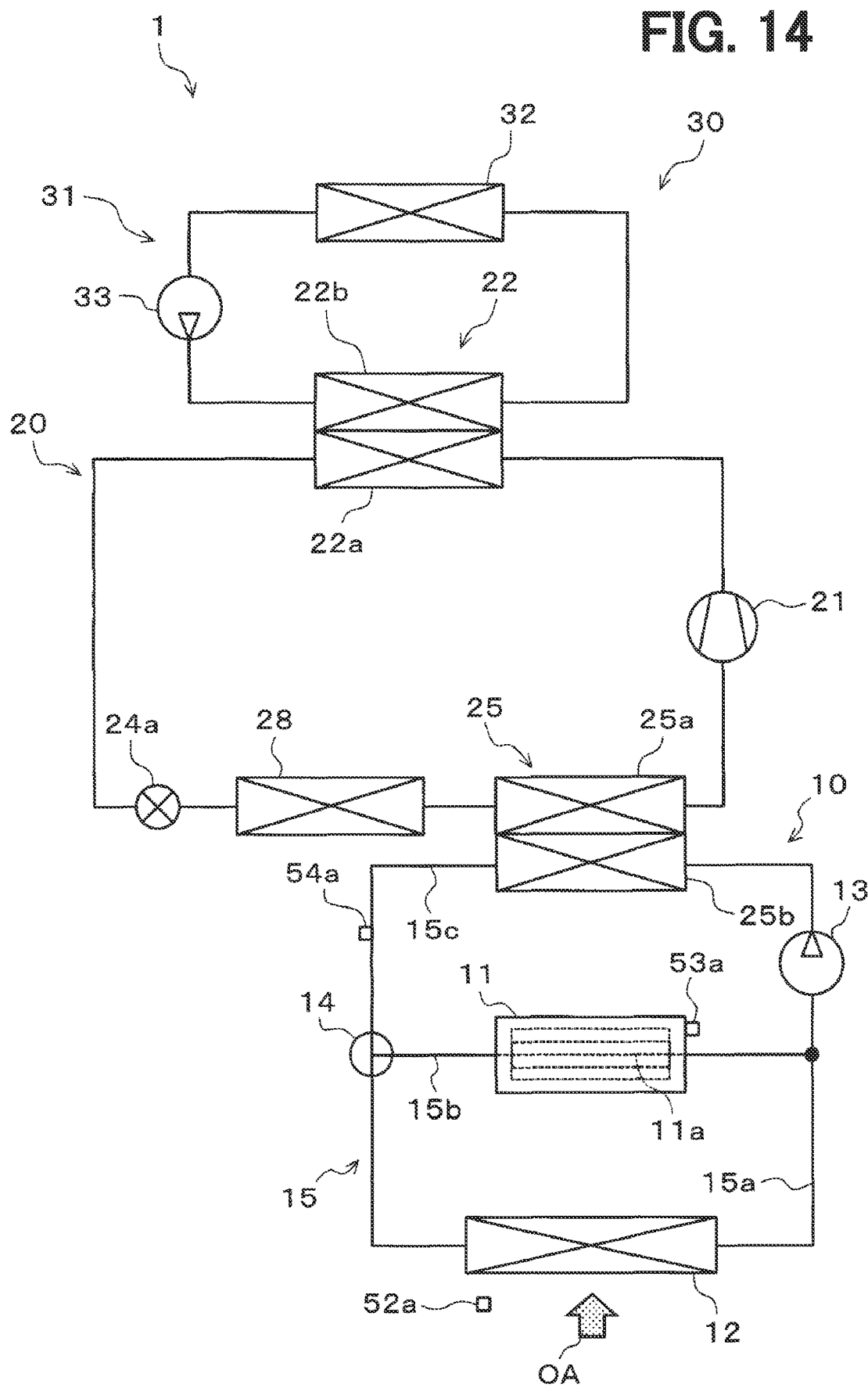
FIG. 14 is an explanatory view showing a second modification of the refrigeration cycle in the battery temperature control device.

The chiller 25 and the outdoor heat exchanger 28 in the refrigeration cycle 20 may be disposed so that the outdoor heat exchanger 28 and the chiller 25 are connected in parallel as illustrated in FIG. 13, or so that the outdoor heat exchanger 28 and the chiller 25 are connected in series as illustrated in FIG. 14.

In the second embodiment described above, the heating medium passage 25b of the chiller 25 is disposed in the common flow path 15c of the heating medium circuit 10, and the battery heat exchanger 11 is disposed in the second flow path 15b, but the present invention is not limited to this aspect.

Figure 15:
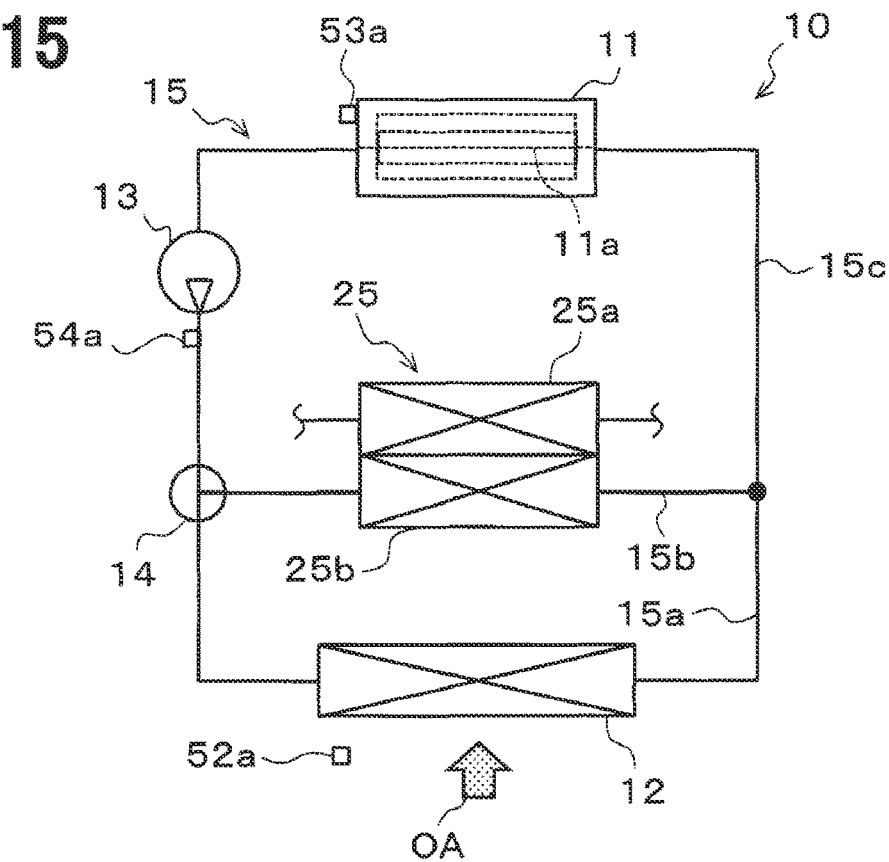
FIG. 15 is an explanatory view showing a first modification regarding the arrangement of a battery heat exchanger and a chiller in the heating medium circuit of the battery temperature control device.
Figure 16:
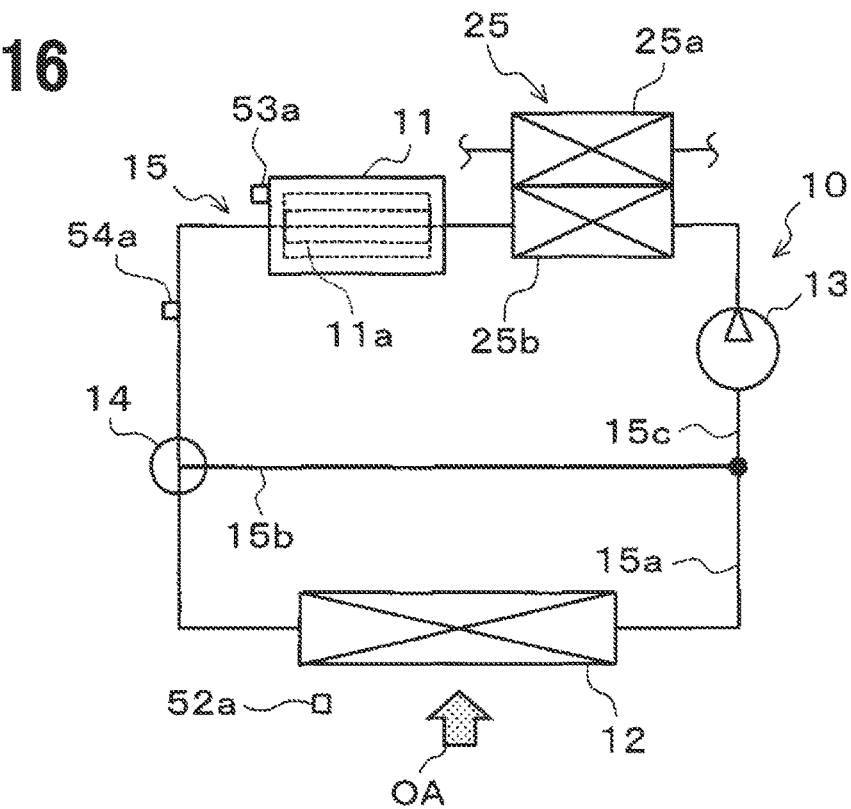
FIG. 16 is an explanatory diagram illustrating a second modification regarding the arrangement of the battery heat exchanger and the chiller in the heating medium circuit of the battery temperature control device.

For example, as illustrated in FIG. 15, the battery heat exchanger 11 may be disposed in the common flow path 15c of the heating medium circuit 10, and the heating medium passage 25b of the chiller 25 may be disposed in the second flow path 15b. As illustrated in FIG. 16, the battery heat exchanger 11 and the heating medium passage 25b of the chiller 25 may be connected in series in the common flow path 15c of the heating medium circuit 10.

In the above embodiment, the air-conditioning evaporator 26 is used with a configuration that chills the blast air using the refrigerant of the refrigeration cycle 20 as a cold heat source, but the present invention is not limited to this mode. For example, in the refrigeration cycle 20, the configuration in which the second chiller may be disposed in parallel with the chiller 25 to chill the heating medium may be a configuration in which the heating medium circuit via the second chiller may be provided with a cooler core for exchanging heat between the blast air and the heating medium. According to this configuration, the blast air can be chilled by the cooler core via the heating medium using the refrigerant of the refrigeration cycle 20 as a cold heat source.

Although the present disclosure is described in accordance with examples, it is understood that the present disclosure is not limited to the examples and structures. The present disclosure also includes various modification examples and modifications within an equivalent range. In addition, various combinations and modes, and other combinations and modes including only one element, more elements, or less elements therein are also within the scope and idea of the present disclosure.

What is claimed is:

1. A battery temperature control device comprising:
   a heating medium circuit that connects a battery heat exchanger that exchanges heat between a battery and a heating medium, an outside air heat exchanger that is connected in parallel to the battery heat exchanger and exchanges heat between the heating medium and outside air, a heating medium pump that pumps and circulates the heating medium, and a flow rate regulating unit that adjusts a flow rate of the heating medium in a first path through which the heating medium flows via at least the outside air heat exchanger and a flow rate of the heating medium in a second path through which the heating medium flows by detouring around the outside air heat exchanger, and that circulates the heating medium;
   a control unit that controls an operation of the flow rate regulating unit;
   a battery temperature acquisition unit that acquires a battery temperature that is a temperature of the battery; and
   a common flow path temperature acquisition unit that acquires a common flow path temperature that is a temperature of the heating medium flowing through a common flow path common to both the first path and the second path, wherein
   when an outside air temperature that is a temperature of the outside air is a low temperature environment lower than a predetermined reference outside air temperature, the control unit controls an operation of the flow rate regulating unit to adjust a flow rate ratio between a flow rate of the heating medium in the first path and a flow rate of the heating medium in the second path so that the battery temperature is a predetermined reference temperature, and
   the control unit controls an operation of the flow rate regulating unit so that a flow rate of the heating medium in the first path increases as the common flow path temperature acquired by the common flow path temperature acquisition unit increases.

2. The battery temperature control device according to claim 1, wherein the heating medium pump is disposed in the common flow path.

3. The battery temperature control device according to claim 1, wherein
   a chiller that exchanges heat between the heating medium and a refrigerant circulating in a refrigeration cycle is disposed in the common flow path of the heating medium circuit, and wherein
   the refrigeration cycle includes
   a compressor that compresses and discharges the refrigerant,
   a heating unit including a condenser that condenses a high pressure refrigerant discharged from the compressor, the heating unit heating blast air blown into a space to be air-conditioned using the high pressure refrigerant as a heat source,
   a decompression unit that decompresses the refrigerant flowing out of the condenser, and
   the chiller through which the refrigerant flowing out of the decompression unit flows.

4. The battery temperature control device according to claim 3, wherein when the heating unit heats the blast air, the control unit controls an operation of the flow rate regulating unit so that the common flow path temperature acquired by the common flow path temperature acquisition unit is equal to or lower than the outside air temperature.

5. The battery temperature control device according to claim 4, wherein when the heating unit heats the blast air, the control unit further controls an operation of the flow rate regulating unit so that a temperature difference between the outside air temperature and the common flow path temperature is smaller than a predetermined value.

6. The battery temperature control device according to claim 3, wherein
   in a situation where the flow rate regulating unit adjusts the battery temperature and the heating unit heats the blast air in the low temperature environment,
   when the common flow path temperature acquired by the common flow path temperature acquisition unit is equal to or higher than the outside air temperature, the control unit controls an operation of the flow rate regulating unit so that a flow rate of the heating medium in the first path increases, and
   when the common flow path temperature is lower than the outside air temperature and a temperature difference between the outside air temperature and the common flow path temperature is larger than a predetermined value, the control unit controls an operation of the flow rate regulating unit so that a flow rate of the heating medium in the first path decreases.

7. The battery temperature control device according to claim 3, wherein
   the decompression unit includes
   a first decompression unit that decompresses the refrigerant flowing from the condenser toward the chiller, and
   a second decompression unit that decompresses the refrigerant flowing out of the condenser and detouring around the first decompression unit, wherein
   the battery temperature control device comprises
   an air-conditioning heat exchange unit that chills the blast air by heat exchange using the refrigerant circulating in the refrigeration cycle as a cold heat source, and
   a blast air temperature acquisition unit that acquires a blast air temperature that is a temperature of the blast air that passed through the air-conditioning heat exchange unit, and
   the control unit controls an operation of the flow rate regulating unit so that the common flow path temperature is lower than the blast air temperature acquired by the blast air temperature acquisition unit.

8. The battery temperature control device according to claim 7, wherein the air-conditioning heat exchange unit is an air-conditioning evaporator that exchanges heat between the refrigerant decompressed by the second decompression unit of the refrigeration cycle and the blast air to chill the blast air.

* * * * *